(12) United States Patent
Kaidu et al.

(10) Patent No.: US 12,092,122 B2
(45) Date of Patent: Sep. 17, 2024

(54) BLOWER DEVICE

(71) Applicant: MINEBEA MITSUMI Inc., Nagano (JP)

(72) Inventors: Hiroyuki Kaidu, Kakegawa (JP); Satoshi Masuo, Mitaka (JP); Shinichi Uchikawa, Nagano (JP); Xiao Zhou, Yokohama (JP); Mitsunari Terada, Mito (JP)

(73) Assignee: MINEBEA MITSUMI Inc., Nagano (JP)

( * ) Notice: Subject to any disclaimer, the term of this patent is extended or adjusted under 35 U.S.C. 154(b) by 246 days.

(21) Appl. No.: 17/274,582

(22) PCT Filed: Sep. 4, 2019

(86) PCT No.: PCT/JP2019/034692
§ 371 (c)(1),
(2) Date: Mar. 9, 2021

(87) PCT Pub. No.: WO2020/054525
PCT Pub. Date: Mar. 19, 2020

(65) Prior Publication Data
US 2022/0049708 A1  Feb. 17, 2022

(30) Foreign Application Priority Data
Sep. 13, 2018  (JP) .................. 2018-171905

(51) Int. Cl.
*F04D 25/16* (2006.01)
*F04D 15/00* (2006.01)
*F04D 27/00* (2006.01)

(52) U.S. Cl.
CPC ......... *F04D 25/16* (2013.01); *F04D 15/0077* (2013.01); *F04D 25/166* (2013.01); *F04D 27/004* (2013.01)

(58) Field of Classification Search
CPC .. F04D 15/0077; F04D 19/007; F04D 25/166; F04D 27/04
See application file for complete search history.

(56) References Cited

U.S. PATENT DOCUMENTS 6,612,817 B2   9/2003  Lin et al.
6,626,653 B2   9/2003  Lin et al.
(Continued)

FOREIGN PATENT DOCUMENTS

CN   108169672 A   6/2018
CN   207634360 U   7/2018
(Continued)

OTHER PUBLICATIONS

International Search Report for corresponding International Application No. PCT/JP2019/034692 dated Nov. 26, 2019.
(Continued)

*Primary Examiner* — Courtney D Heinle
*Assistant Examiner* — Danielle M. Christensen
(74) *Attorney, Agent, or Firm* — Pearne & Gordon LLP

(57) ABSTRACT

A fan includes a first blower and a second blower each having an impeller. The first blower includes a first motor and a first motor drive controller to control driving of the first motor and communicate with the second blower. The second blower includes a second motor and a second motor drive controller to control driving of the second motor and communicate with the first blower. The first motor drive controller controls the driving of the first motor based on a result of communication with the second blower.

8 Claims, 12 Drawing Sheets

(56) References Cited

U.S. PATENT DOCUMENTS

| | | | |
|---|---|---|---|
| 6,725,132 B2* | 4/2004 | Frankel | G05D 23/1902 |
| | | | 702/132 |
| 8,556,593 B2* | 10/2013 | Osawa | F04D 27/0269 |
| | | | 417/44.11 |
| 9,559,623 B2* | 1/2017 | Mullin | H02P 6/181 |
| 10,690,138 B2* | 6/2020 | Sasaki | F04D 27/004 |
| 2005/0046362 A1 | 3/2005 | Ma et al. | |
| 2005/0106026 A1 | 5/2005 | Oosawa et al. | |
| 2006/0261761 A1* | 11/2006 | Ma | F04D 27/00 |
| | | | 318/49 |
| 2008/0036403 A1 | 2/2008 | Ma et al. | |
| 2010/0260616 A1 | 10/2010 | Osawa et al. | |
| 2014/0363272 A1 | 12/2014 | Kitamura et al. | |
| 2018/0156225 A1 | 6/2018 | Izumi | |

FOREIGN PATENT DOCUMENTS

| | | |
|---|---|---|
| JP | 04-203494 A | 7/1992 |
| JP | 10-002295 A | 1/1998 |
| JP | 11-094418 A | 4/1999 |
| JP | 3086497 U | 6/2002 |
| JP | 2004-278370 A | 10/2004 |
| JP | 2005-069217 A | 3/2005 |
| JP | 2014-238059 A | 12/2014 |
| WO | 2009/057598 A1 | 5/2009 |

OTHER PUBLICATIONS

Written Opinion for corresponding International Application No. PCT/JP2019/034692 dated Nov. 26, 2019 and English translation.
International Preliminary Report on Patentability for corresponding International Application No. PCT/JP2019/034692 dated Mar. 9, 2021.
Notice of Reasons for Refusal dated Dec. 21, 2022 for corresponding Japanese Application No. 2018-171905 and English translation.
First Office Action dated Apr. 12, 2022 for corresponding Chinese Application No. 201980057494.8 and English translation.
Notice of Reasons for Refusal dated Mar. 28, 2022 for corresponding Japanese Application No. 2018-171905 and English translation.
Second Office Action dated Aug. 19, 2022 for corresponding Chinese Application No. 201980057494.8 and English translation.
Notice of Reasons for Refusal dated Sep. 6, 2022 in the corresponding Japanese Application No. 2018-171905 and English translation.
Notice of Reasons for Refusal dated Dec. 20, 2023 for corresponding Japanese Application No. 2023-072875 and English translation.

* cited by examiner

BLOWER DEVICE

TECHNICAL FIELD

The present invention relates to a blower device, and particularly relates to a blower device including two blowers.

BACKGROUND ART

A blower device includes two blowers that each cause an impeller attached to a rotor to rotate by a motor acting as a driving source. Such a blower device is, for example, a contra-rotating blower having a structure in which two axial fans including respective impellers are put on top of each other along a rotation axis and the impellers are configured to rotate in mutually different directions (for example, see Patent Literature 1).

DOCUMENT LIST

Patent Literature

Patent Literature 1: Japanese Patent Application Publication No. 2004-278370

SUMMARY OF INVENTION

Technical Problem

In a blower device like a contra-rotating blower, even if one blower malfunctions, another blower that is not faulty can keep its impeller rotating and thus the blower device can ensure air volume and static pressure to some extent.

When one blower malfunctions in this way, the other blower, which is not faulty, desirably operates at an increased rotation rate to enable the overall blower device to ensure air volume and static pressure.

It is an object of the present invention, accomplished to solve such a challenge, to provide a blower device capable of reducing a decrease in air volume and static pressure ensured by the overall blower device when one of blowers in the blower device malfunctions.

Solution to Problem

According to an aspect of the present invention accomplished to attain the object described above, a blower device includes a first blower and a second blower each including an impeller, wherein the first blower includes a first motor to rotate the impeller of the first blower, first drive control unit to control driving of the first motor, and first communication unit to communicate with the second blower, the second blower includes a second motor to rotate the impeller of the second blower, second drive control unit to control driving of the second motor, and second communication unit to communicate with the first blower, and the first drive control unit controls the driving of the first motor based on a result of communication with the second blower.

It is preferable that the first drive control unit drive the first motor in either of a first drive mode and a second drive mode different from the first drive mode by switching between the first drive mode and the second drive mode based on a result of communication with the second blower.

It is preferable that the first drive mode be a drive mode and in the drive mode, the motor be driven at a rotation rate corresponding to information about a speed command input from an external device.

It is preferable that the second drive mode be a drive mode and in the drive mode, the motor be driven at a predetermined rotation rate higher than the rotation rate corresponding to information about the speed command.

It is preferable that the second drive mode be a drive mode and in the drive mode, the motor be driven so as to output torque as high as possible and rotate a rotor of the motor with the highest torque.

It is preferable that the second blower include second abnormality detection unit to detect occurrence of an abnormality in the second blower, when the occurrence of an abnormality in the second blower is detected by the second abnormality detection unit, the second communication unit send information indicating detection of the abnormality to the first blower, and when the first communication unit receives information about the occurrence of an abnormality in the second blower, the first drive control unit switch the drive mode for the first motor from the first drive mode to the second drive mode.

It is preferable that the first communication unit be configured to make an inquiry to the second blower, and when a response to the inquiry has not been sent from the second blower for a predetermined length of time, the first drive control unit switch the drive mode for the first motor from the first drive mode to the second drive mode.

It is preferable that in response to reception of information indicating the second blower is normal through communication with the second blower while driving the first motor in the second drive mode, the first drive control unit switch the drive mode for the first motor from the second drive mode to the first drive mode.

It is preferable that the second drive control unit control the driving of the second motor based on a result of communication with the first blower.

It is preferable that the second drive control unit drive the second motor in either of the first drive mode and the second drive mode by switching between the first drive mode and the second drive mode based on a result of communication with the first blower.

It is preferable that the first blower include first abnormality detection unit to detect occurrence of an abnormality in the first blower, when the occurrence of an abnormality in the first blower is detected by the first abnormality detection unit, the first communication unit send the second blower a command used to drive the second motor in the second drive mode, and when the second communication unit receives the command used to drive the second motor in the second drive mode, the second drive control unit drive the second motor in the second drive mode.

It is preferable that the first communication unit be configured to make an inquiry to the second blower, and when the inquiry has not been made by the first communication unit for a predetermined length of time, the second drive control unit switch the drive mode for the second motor from the first drive mode to the second drive mode.

It is preferable that the blower device include a communication line connecting the first blower with the second blower to enable communication between the first and the second blowers.

It is preferable that the first blower and the second blower be axial fans disposed with centers of rotation axes of impellers of the first and the second blowers being aligned along an axial-flow direction, and the first blower and the second blower cause the respective impellers to rotate in mutually different directions.

Effects of Invention

A blower device provided according to any of the aspects of the present invention is capable of reducing a decrease in air volume and static pressure ensured by the overall blower device when one of blowers in the blower device malfunctions.

DESCRIPTION OF EMBODIMENTS

Hereinafter, a blower device according to an embodiment of the present invention will be described.

Embodiment

Figure 1:
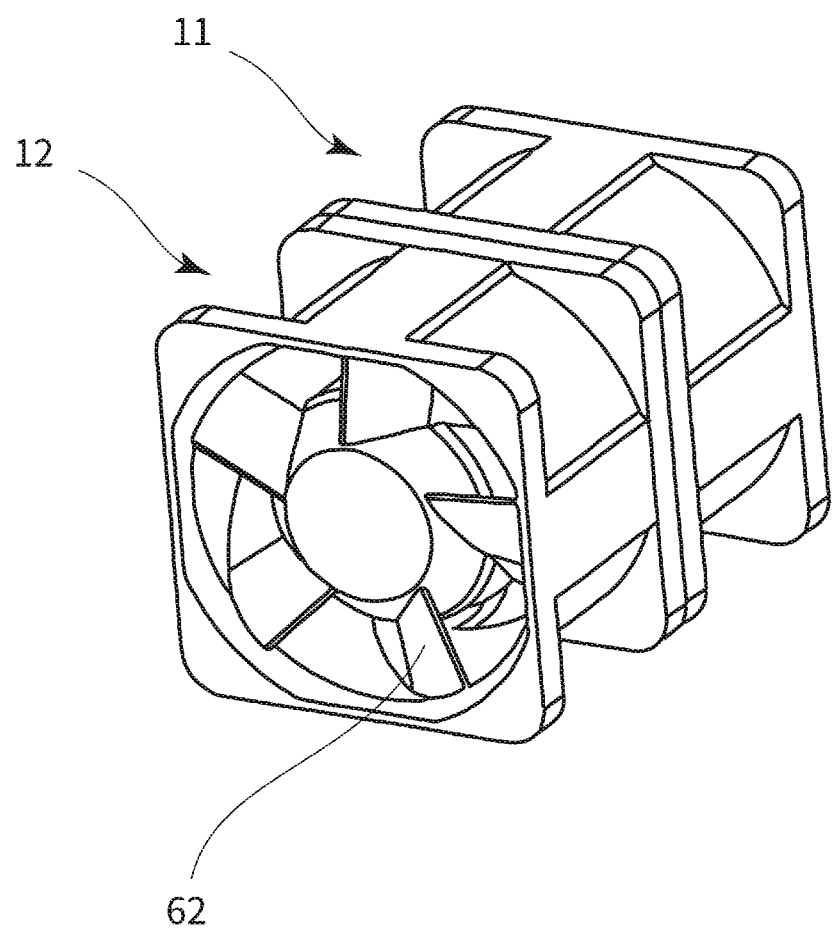
FIG. 1 A perspective view showing a fan according to an embodiment of the present invention.
Figure 2:
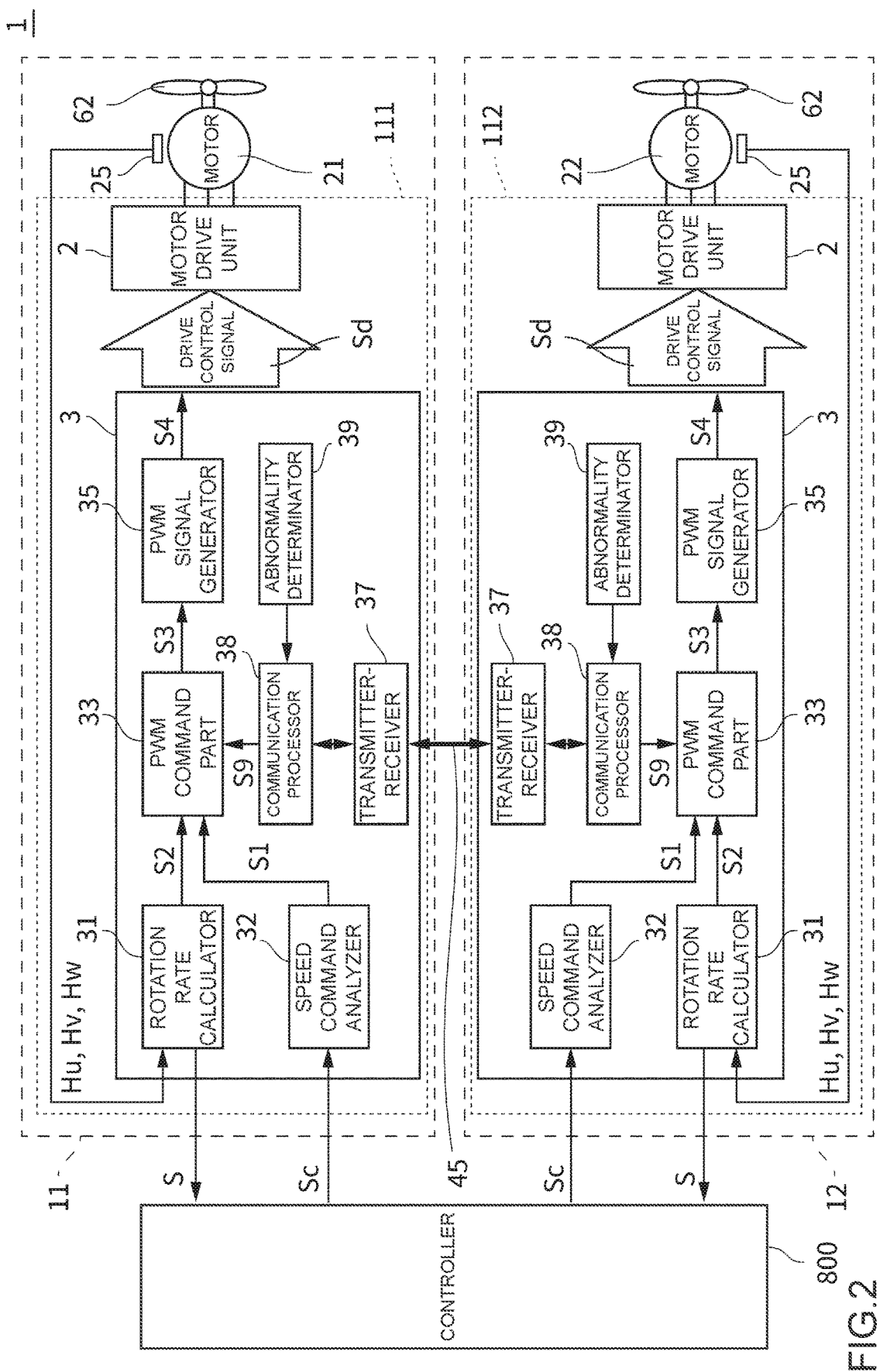
FIG. 2 A block diagram showing a configuration of a fan.

FIG. 1 is a perspective view showing a fan 1 according to an embodiment of the present invention. FIG. 2 is a block diagram showing a configuration of the fan 1.

As shown in FIGS. 1 and 2, the fan 1 (an example of a blower device) is a blower device including two blowers 11, 12 (a first blower 11, a second blower 12) that each have an impeller 62. In the present embodiment, the fan 1 includes the first blower 11 on an inlet side (a suction side) and the second blower 12 on an outlet side (a discharge side). In the present embodiment, the first blower 11 and the second blower 12 are attached to an integrated frame to be combined into the fan 1.

The first blower 11 and the second blower 12 are axial fans disposed such that centers of rotation axes of the respective impellers 62 are aligned along an axial-flow direction. The first blower 11 and the second blower 12 cause the respective impellers 62 to rotate in mutually different directions. To put it another way, a direction in which the impeller 62 of the first blower 11 rotates is opposite a direction in which the impeller 62 of the second blower 12 rotates when viewed along the rotation axes. In other words, the fan 1 is what is called a contra-rotating blower. In the present embodiment, the fan 1 is, for example, a fan motor that discharges heat of air generated in an interior of an electronic device, such as an electronic computer or office automation equipment, outside by wind force to cool the interior of the electronic device.

The fan 1 includes a communication line 45 connecting the first blower 11 with the second blower 12 to enable communication between the blowers. The communication enabled between the first blower 11 and the second blower 12 will be described later.

The first blower 11 includes a first motor 21 to rotate the impeller 62 of the first blower 11 and a first motor drive controller 111 (an example of first drive control unit, first communication unit, and first abnormality detection unit). The impeller 62 is attached to a rotation shaft of a rotor of the first motor 21.

The second blower 12 includes a second motor 22 to rotate the impeller 62 of the second blower 12 and a second motor drive controller 112 (an example of second drive control unit, second communication unit, and second abnormality detection unit). The impeller 62 is attached to a rotation shaft of a rotor of the second motor 22.

Hereinafter, the first motor 21 and the second motor 22 are sometimes referred to as motors 21 and 22 without a distinction between the first and the second. The first motor drive controller 111 and the second motor drive controller 112 are sometimes referred to as motor drive controllers 111 and 112 without a distinction between the first and the second.

The motor drive controllers 111 and 112 drive the respective motors 21 and 22. In the present embodiment, the motors 21 and 22 are, for example, three-phase brushless motors. The motor drive controllers 111 and 112 cause drive currents to periodically flow through coils in the motors 21 and 22 and thereby enable the rotors of the motors 21 and 22 to rotate.

The fan 1 is connected to a controller 800 that is an example of an external device. In the present embodiment, the controller 800 outputs speed command signals Sc (an example of speed command information) corresponding to rotational speeds (rotation rates) of the motors 21 and 22 to the blowers 11 and 12. The speed command signals Sc are input to the motor drive controllers 111 and 112. The motor drive controllers 111 and 112 are able to drive the motors 21 and 22 at rotation rates corresponding to the speed command signals Sc. The motor drive controllers 111 and 112 output rotation rate signals S (e.g., frequency generator (FG) signals) corresponding to the motors 21 and 22 to the controller 800. The controller 800 is used to sense drive states of the blowers 11 and 12 based on the rotation rate signals S and conduct an operation, such as controlling speed command signals Sc it outputs, in response to the sensed drive states. The rotation rate signals S may not be output outside from the fan 1.

In the present embodiment, the first motor drive controller 111 and the second motor drive controller 112 operate in a substantially similar way except some specific actions or steps performed when the motor drive controllers 111 and 112 communicate with each other as described later.

As described later, the first motor drive controller 111 serves as first drive control unit to control driving of the first motor 21, as first communication unit to communicate with the second blower 12, and as first abnormality detection unit to detect occurrence of an abnormality in the first blower 11. The second motor drive controller 112 serves as second drive control unit to control driving of the second motor 22, as second communication unit to communicate with the first blower 11, and as second abnormality detection unit to detect occurrence of an abnormality in the second blower 12.

The first motor drive controller 111 and the second motor drive controller 112 have identical hardware configurations. Hereinafter, components common to the first motor drive controller 111 and the second motor drive controller 112 are assigned with the same reference numerals, and descriptions given of these components are common to the first motor drive controller 111 and the second motor drive controller 112 unless otherwise specified.

The motor drive controllers 111 and 112 each include a motor drive unit 2 and a control circuit unit 3. Components of the motor drive controllers 111 and 112 shown in FIG. 2 are a part of a whole. The motor drive controllers 111 and 112 may have other components in addition to the components shown in FIG. 2.

In the present embodiment, each of the motor drive controllers 111 and 112 is an integrated circuit (IC) device in which a part (e.g., the control circuit unit 3 and the motor drive unit 2) is packaged. The whole of each of the motor drive controllers 111 and 112 may be packaged as a single integrated circuit device. Each of the motor drive controllers 111 and 112 may be packaged in whole or in part together with another device to constitute a single integrated circuit device.

The motor drive unit 2 includes an inverter circuit and a pre-drive circuit. The motor drive units 2, based on drive control signals Sd output from the control circuit units 3, output drive signals to the motors 21 and 22 to drive the motors 21 and 22.

The pre-drive circuit, in accordance with control by the control circuit unit 3, generates an output signal for driving the inverter circuit and outputs the output signal to the inverter circuit. The inverter circuits, based on the output signals output from the pre-drive circuits, output drive signals to the motors 21 and 22 to energize the coils included in the motors 21 and 22.

A speed command signal Sc output from the controller 800 is input to the control circuit unit 3. The control circuit unit 3 outputs a rotation rate signal S to the controller 800.

The speed command signals Sc are signals related to rotational speeds of the motors 21 and 22. The speed command signals Sc are, for example, pulse-width modulation (PWM) signals corresponding to target rotational speeds of the motors 21 and 22. In other words, the speed command signals Sc are information about speed commands corresponding to target values of the rotational speeds of the motors 21 and 22. Clock signals may be input as the speed command signals Sc.

In the present embodiment, three Hall signals (position detection signals) Hu, Hv, and Hw from the motors 21 and 22 are input to the control circuit units 3. The Hall signals Hu, Hv, and Hw are, for example, signals output from three Hall elements 25u, 25v, and 25w that are disposed on each of the motors 21 and 22. The Hall signals Hu, Hv, and Hw are signals associated with rotation of the rotors of the motors 21 and 22. The control circuit units 3 detect rotational states of the motors 21 and 22 by the Hall signals Hu, Hv, and Hw to control driving of the motors 21 and 22. In other words, the control circuit units 3 detect rotational positions of the rotors of the motors 21 and 22 by the Hall signals Hu, Hv, and Hw to control driving of the motors 21 and 22. The control circuit units 3 are able to acquire actual rotation rate information concerning actual rotation rates of the rotors of the motors 21 and 22 by the Hall signals Hu, Hv, and Hw to control driving of the motors 21 and 22.

The three Hall elements 25 that emit the Hall signals Hu, Hv, and Hw (in FIG. 2, one Hall element 25 is shown for each of the motors 21 and 22 for the sake of simplification) are, for example, arranged around the rotor of each of the motors 21 and 22 at substantially regular intervals (at an interval of 120 degrees between the adjacent elements). The three Hall elements 25 detect a magnetic pole of the rotor of each of the motors 21 and 22 and emit the respective Hall signals Hu, Hv, and Hw.

In addition to such Hall signals Hu, Hv, and Hw or in place of the Hall signals Hu, Hv, and Hw, other information concerning the rotational states of the motors 21 and 22 may be input to the control circuit units 3. For instance, as FG signals associated with rotation of each of the rotors of the motors 21 and 22, signals (pattern FG) generated by a coil pattern formed on a substrate adjacent to the rotor may be input to the control circuit unit 3. The control circuit units may be configured to sense the rotational states of the motors 21 and 22 based on results detected with rotational position detection circuits that detect back electromotive force induced in phases (U-, V-, and W-phases) of the motors 21 and 22. An electronic device such as an encoder or a resolver may be provided, and information including rotational speeds of the motors 21 and 22 may be detected by the electronic device.

The control circuit unit 3 is formed by a microcomputer or a digital circuit, for example. The control circuit units 3 output drive control signals Sd based on input signals to drive the motors 21 and 22. Specifically, based on the Hall signals Hu, Hv, and Hw, the control circuit units 3 output drive control signals Sd to the motor drive units 2.

The control circuit units 3 output drive control signals Sd to the motor drive units 2 to drive the motors 21 and 22 and control the rotation of the motors 21 and 22. The motor drive units 2, based on the drive control signals Sd, output drive signals to the motors 21 and 22 to drive the motors 21 and 22.

The control circuit unit 3 includes a rotation rate calculator 31, a speed command analyzer 32, a PWM command part 33, a PWM signal generator 35, a transmitter-receiver 37, a communication processor 38, and an abnormality determinator 39.

Hall signals Hu, Hv, and Hw output from the three Hall elements 25 are input to the rotation rate calculator 31. The rotation rate calculators 31, based on the input Hall signals Hu, Hv, and Hw, output positional signals indicating positional relationships between the phases and the rotors of the motors 21 and 22. The rotation rate calculators 31 each, based on the input Hall signals Hu, Hv, and Hw, generate and output information about an actual rotation rate corresponding to a cycle of the positional signal. In other words, the rotation rate calculators 31 output actual rotation rate information concerning actual rotation rates of the rotors of the motors 21 and 22. In the diagram, actual rotation signals S2 combining the positional signals and the actual rotation rate information are shown. The actual rotation signal S2 is output to the PWM command part 33.

The speed command signal Sc is input to the speed command analyzer 32. The speed command analyzers 32, based on the speed command signals Sc, output target rotation rate signals S1 indicating target rotation rates for the motors 21 and 22. The target rotation rate signal S1 is a PWM signal indicating a duty cycle corresponding to a duty cycle of the speed command signal Sc. The target rotation rate signal S1 is output to the PWM command part 33.

The actual rotation signal S2 output from the rotation rate calculator 31 and the target rotation rate signal S1 output from the speed command analyzer 32 are input to the PWM command part 33. A setting signal S9 output from the communication processor 38 is input to the PWM command part 33, as described later. The PWM command part 33 generates and outputs a PWM setting command signal S3 indicating a duty cycle to output the drive control signal Sd. The PWM setting command signal S3 is output to the PWM signal generator 35.

The PWM setting command signal S3 is input to the PWM signal generator 35. The PWM signal generator 35, based on the PWM setting command signal S3, generates a PWM signal S4 to drive the motor drive unit 2. The PWM signal S4 is, for example, a signal identical in duty cycle to the PWM setting command signal S3. In other words, the PWM signal S4 is a signal having a duty cycle corresponding to the duty cycle of the PWM setting command signal S3.

The PWM signal S4 output from the PWM signal generator 35 is output as a drive control signal Sd from the control circuit unit 3 to the motor drive unit 2. As a result, drive signals are output from the motor drive units 2 to the motors 21 and 22 to drive the motors 21 and 22.

The transmitter-receiver 37 is an interface for communications. The transmitter-receiver 37 of the first blower 11 is connected with the transmitter-receiver 37 of the second blower 12 through the communication line 45. The communication line 45 may be a single line or a plurality of lines, and information may be communicated by serial communication or parallel communication. The transmitter-receiver 37 of the first blower 11 is able to communicate with the transmitter-receiver 37 of the second blower 12. The communication is controlled by the communication processor 38.

The communication processor 38 controls operation of the transmitter-receiver 37 to control communication between the first blower 11 and the second blower 12. In other words, the communication processor 38 of the first blower 11 controls the transmitter-receiver 37 of the first blower 11 to communicate with the second blower 12. As described later, depending on content communicated between the first blower 11 and the second blower 12, the communication processor 38 outputs the setting signal S9 to the PWM command part 33.

In the present embodiment, the first blower 11 and the second blower 12 are configured to communicate with each other, with the first blower 11 acting as a master and the second blower 12 acting as a slave. For instance, the communication processor 38 of the first blower 11 sends an inquiry about a state the second blower 12 is in to the second blower 12 via the transmitter-receiver 37. In other words, the inquiry is equivalent to requesting the second motor drive controller 112 to send information about the second motor 22's driven state in the second blower 12 to the first motor drive controller 111. In response to the inquiry sent from the first blower 11 via the transmitter-receiver 37, the communication processor 38 of the second blower 12 sends a message about the state the second blower 12 is in, i.e., the second motor 22's driven state, to the first blower 11 via the transmitter-receiver 37. In addition, the first blower 11 and the second blower 12 can communicate with each other, such as the first blower 11 being configured to send a predetermined instruction command to the second blower 12 and the second blower 12 being configured to send a response to the instruction command to the first blower 11. As described above, the transmitter-receiver 37 and the communication processor 38 included in the control circuit unit 3 of the first motor drive controller 111 function directly as the first communication unit, while the transmitter-receiver 37 and the communication processor 38 included in the control circuit unit 3 of the second motor drive controller 112 function directly as the second communication unit.

The abnormality determinators 39 detect the occurrence of an abnormality in the blowers 11 and 12. In other words, the abnormality determinators 39 determine whether or not the blowers 11 and 12 are in an abnormal state. When the occurrence of an abnormality in the first blower 11 is detected by the abnormality determinator 39 of the first blower 11, the communication processor 38 of the first blower 11 operates to respond to the abnormality. When the occurrence of an abnormality in the second blower 12 is detected by the abnormality determinator 39 of the second blower 12, the communication processor 38 of the second blower 12 operates to respond to the abnormality. As described above, the abnormality determinator 39 included in the control circuit unit 3 of the first motor drive controller 111 functions directly as the first abnormality detection unit, while the abnormality determinator 39 included in the control circuit unit 3 of the second motor drive controller 112 functions directly as the second abnormality detection unit.

The abnormality determinator 39 detects the occurrence of an abnormality, for example, when the motor 21 or 22 is not driven normally due to the occurrence of a fault, such as a broken wire, in the motor 21 or 22. The abnormality determinator detects the occurrence of an abnormality, for example, when the motor 21 or 22 is locked because of a fault such as a foreign object caught in the impeller 62. However, the faults are not limited to these examples. In other words, subjects (e.g., rotation rate, temperature, electric current, and other factors responsible for abnormality) through which the occurrence of an abnormality is directly detected are diverse, and the subjects examined for detection of abnormalities are not particularly limited in the present embodiment.

In the present embodiment, the control circuit units 3 drive the motors 21 and 22 in either of a first drive mode and a second drive mode. The first drive mode is a drive mode in which either of the motors 21 and 22 is driven at a rotation rate corresponding to the speed command signal Sc. The second drive mode is a drive mode in which either of the motors 21 and 22 is driven at a predetermined rotation rate higher than a rotation rate corresponding to information about the speed command.

In the present embodiment, the second drive mode is a drive mode in which either of the motors 21 and 22 is driven at the predetermined rotation rate irrespective of the input speed command signal Sc. Specifically, the second drive mode is a drive mode in which the motor 21 or 22 is driven so as to output torque as high as possible and rotate the rotor with the highest torque. In other words, the second drive mode is a drive mode in which the motor 21 or 22 is driven to enable the rotor of the motor 21 or 22 in the blower 11 or 12 to rotate at a highest possible rotation rate (an example of the predetermined rotation rate).

When the control circuit unit 3 operates in the first drive mode, the PWM command part 33 outputs the PWM setting command signal S3 based on the actual rotation signal S2, i.e., the positional signal and the actual rotation rate information, and the target rotation rate signal S1. Specifically, the PWM command part 33 compares the target rotation rate signal S1 with the actual rotation rate information corresponding to the rotation rate of either of the motors 21 and 22 and generates the PWM setting command signal S3 such that the rotational speed of either of the motors 21 and 22 reaches a rotational speed corresponding to the target rotation rate signal S1. Since the PWM setting command signal S3 is generated in this way, the drive control signal Sd based on the speed command signal Sc is output from the control circuit unit 3, and either of the motors 21 and 22 is driven at a rotation rate corresponding to the speed command signal Sc.

Meanwhile, when the control circuit unit 3 operates in the second drive mode, the PWM command part 33 outputs a PWM setting command signal S3 generated in a predetermined way, irrespective of the target rotation rate signal S1. Specifically, the PWM command part 33 generates the PWM setting command signal S3 that enables the rotor of the motor 21 or 22 in the blower 11 or 12 to rotate at a highest possible rotation rate. For instance, if a maximum duty cycle of each of the PWM signal S4 to be output from the PWM signal generator 35 and the PWM setting command signal S3 to be output from the PWM command part 33 is 100% and if the output of the PWM signal S4 with a duty cycle of 100% enables either of the motors 21 and 22 to be driven, the PWM command part 33 generates and outputs the PWM setting command signal S3 with a duty cycle of 100%. Since the PWM setting command signal S3 is generated by either of the first and the second motor drive controllers 111 and 112 in this way, the drive control signal Sd that is not based on the speed command signal Sc is output from the control circuit unit 3, and either of the motors 21 and 22 is driven at the highest possible rotation rate.

When both the first blower 11 and the second blower 12 are driven normally, the control circuit units 3 operate in the first drive mode. In other words, the first blower 11 and the second blower 12 are driven at rotation rates based on the speed command signals Sc.

In the present embodiment, the first blower 11 and the second blower 12 communicate with each other through the communication line 45. The first motor drive controller 111 controls the driving of the first motor 21 based on a result of communication with the second blower 12. Specifically, the control circuit unit 3 of the first motor drive controller 111 drives the first motor 21 in either of the first drive mode and the second drive mode different from the first drive mode by switching between the first drive mode and the second drive mode based on a result of communication with the second motor drive controller 112 of the second blower 12. The second motor drive controller 112 controls the driving of the second motor 22 based on a result of communication with the first blower 11. Specifically, the control circuit unit 3 of the second motor drive controller 112 drives the second motor 22 in either of the first drive mode and the second drive mode by switching between the first drive mode and the second drive mode based on a result of communication with the first motor drive controller 111 of the first blower 11.

The drive modes are switched, for example, as described below. In the present embodiment, whether the control circuit unit 3 operates in the first drive mode or in the second drive mode is determined depending on the setting signal S9 output from the communication processor 38. In other words, the communication processor 38 controls switching between the drive modes in which the control circuit unit 3 operates.

The drive modes are switched depending on a response sent from the second blower 12 in answer to an inquiry that is sent from the first blower 11, the master, to the second blower 12, the slave.

Specifically, when an inquiry is given from the first blower 11 to the second blower 12, the second motor drive controller 112, in response, sends a normal-answer or an abnormal-answer to the first motor drive controller 111.

In other words, in response to an inquiry sent from the first blower 11 to the second blower 12, the second motor drive controller 112, if the second motor 22's driven state is normal, sends information to that effect to the first motor drive controller 111 (normal-answer). When both the first blower 11 and the second blower 12 are driven normally in this way, the control circuit units 3 operate in the first drive mode.

Meanwhile, in response to an inquiry sent from the first blower 11 to the second blower 12, the second motor drive controller 112, if the second motor 22's driven state is not normal, sends information to that effect to the first motor drive controller 111. In other words, when the occurrence of an abnormality in the second blower 12 is detected by the abnormality determinator 39, the communication processor 38 in the second motor drive controller 112 sends information indicating detection of the abnormality to the first blower 11 via the transmitter-receiver 37 (abnormal-answer). When receiving information about the occurrence of an abnormality in the second blower 12, the communication processor 38 in the first motor drive controller 111 switches the drive mode in which the first motor 21 is driven from the first drive mode to the second drive mode. In other words, in response to an abnormal-answer sent from the second motor drive controller 112, the communication processor 38 of the first blower 11 outputs the setting signal S9 to the PWM command part 33. Thus, the PWM command part 33 switches from a state in which it outputs the PWM setting command signal S3 based on the target rotation rate signal S1 to a state in which it outputs the PWM setting command signal S3 that enables the rotor of the first motor 21 to rotate at the predetermined rotation rate. As a result, the first blower 11 in which no abnormality is occurring is driven in the second drive mode.

The drive modes are also switched when the occurrence of an abnormality in the first blower 11 is detected by the abnormality determinator 39.

In other words, the communication processor 38 in the first motor drive controller 111 sends a command to the second blower 12 via the transmitter-receiver 37 to enable the second motor 22 to be driven in the second drive mode. When receiving the command sent to enable the second motor 22 to be driven in the second drive mode, the communication processor 38 in the second motor drive controller 112 switches the drive mode in which the second motor 22 is driven from the first drive mode to the second drive mode. In other words, in response to the received command, the communication processor 38 of the second blower 12 outputs the setting signal S9 to the PWM command part 33. Thus, the PWM command part 33 switches from a state in which it outputs the PWM setting command signal S3 based on the target rotation rate signal S1 to a state in which it outputs the PWM setting command signal S3 that enables the rotor of the second motor 22 to rotate at the predetermined rotation rate. As a result, the second blower 12 in which no abnormality is occurring is driven in the second drive mode.

The drive modes are switched depending on presence or absence of an inquiry sent from the first blower 11, the master, to the second blower 12, the slave, as well as presence or absence of a response to the inquiry.

Specifically, when the first motor drive controller 111 has not made an inquiry for a predetermined length of time while the first motor drive controller 111 is configured to periodically send an inquiry to the second blower 12, the second motor drive controller 112 switches the drive mode in which the second motor 22 is driven from the first drive mode to the second drive mode. This causes the second blower 12 in which no abnormality is occurring to be driven in the second drive mode when an abnormality is, for example, possibly occurring in the first blower 11, such as a malfunction of the control circuit unit 3 due to an event like a cutoff of source voltage.

When a response to an inquiry made to the second blower 12 has not been sent from the second blower 12 for a predetermined length of time since commencement of the inquiry, the first motor drive controller 111 switches the drive mode in which the first motor 21 is driven from the first drive mode to the second drive mode. This causes the first blower 11 in which no abnormality is occurring to be driven in the second drive mode when an abnormality is, for example, possibly occurring in the second blower 12, such as a malfunction of the control circuit unit 3 due to an event like a cutoff of source voltage.

When receiving information to the effect that the second blower 12 is normal through communication with the second blower 12 while driving the first motor 21 in the second drive mode, the first motor drive controller 111 switches the drive mode in which the first motor 21 is driven from the second drive mode to the first drive mode. When receiving information to the effect that the first blower 11 is normal through communication with the first blower 11 while driving the second motor 22 in the second drive mode, the second motor drive controller 112 switches the drive mode in which the second motor 22 is driven from the second drive mode to the first drive mode. Thus, when the abnormal state ends, the blowers are automatically controlled to drive the motors 21 and 22 based on the speed command signals Sc, as controlled initially.

Figure 3:
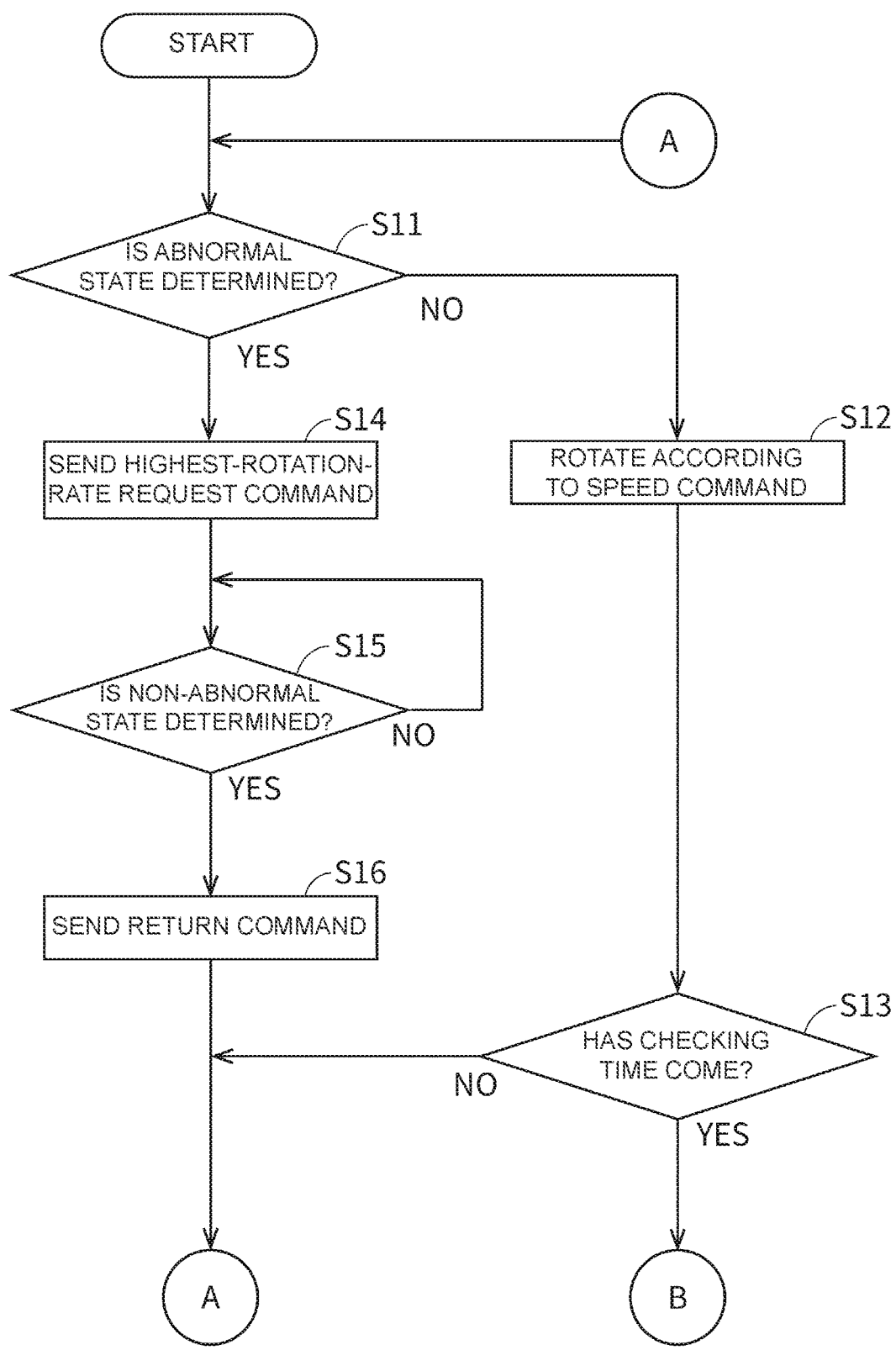
FIG. 3 A first flowchart showing an example of an operational process executed by a control circuit unit in a first motor drive controller.
Figure 4:
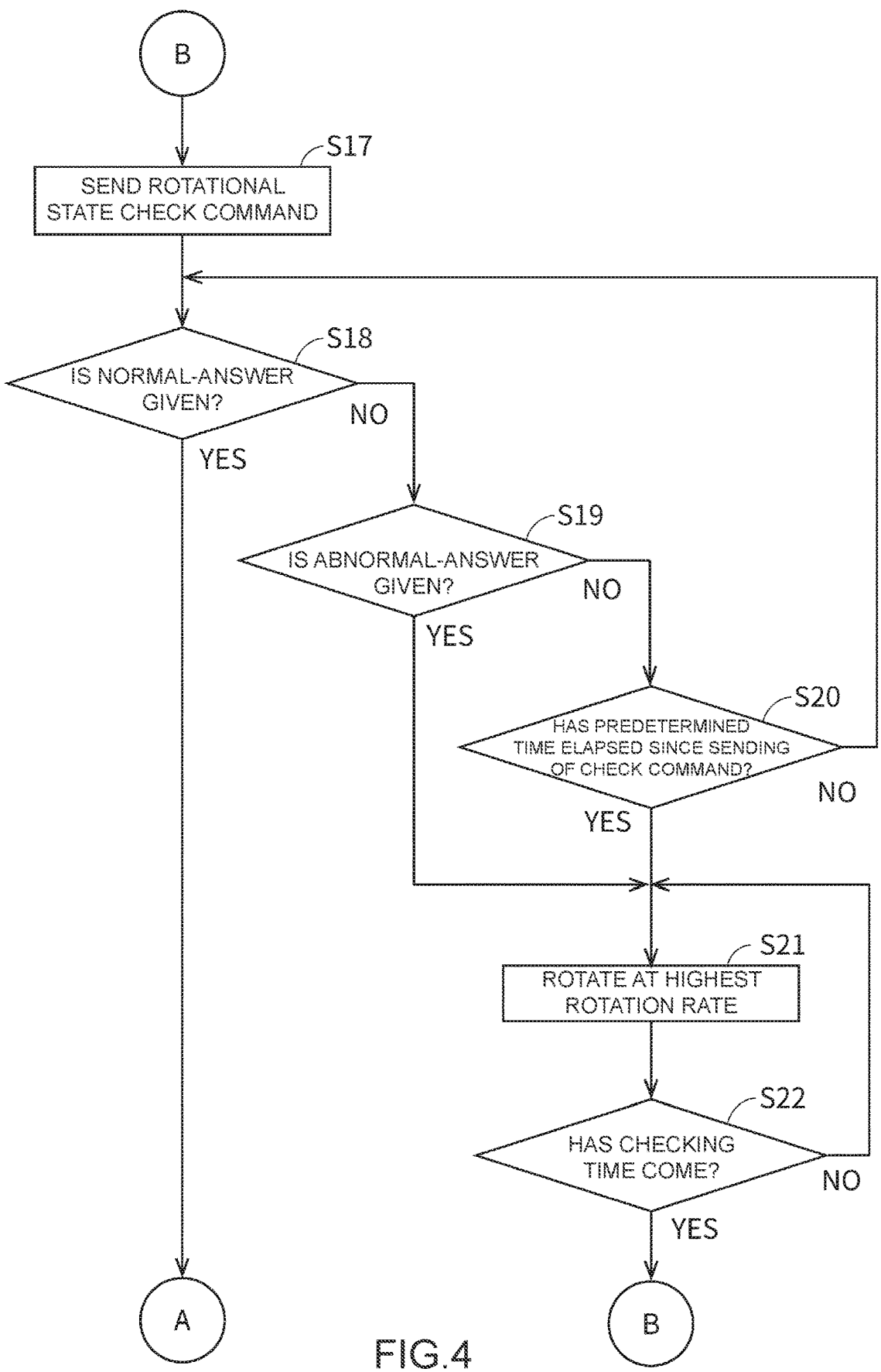
FIG. 4 A second flowchart showing an example of an operational process executed by the control circuit unit in the first motor drive controller.

FIG. 3 is a first flowchart showing an example of an operational process executed by the control circuit unit 3 in the first motor drive controller 111. FIG. 4 is a second flowchart showing an example of an operational process executed by the control circuit unit 3 in the first motor drive controller 111.

In the description given of FIGS. 3 and 4, operations conducted by the components of the first blower 11 are shown unless otherwise specified.

In step S11, as shown in FIG. 3, the communication processor 38 ascertains whether or not an abnormal state, i.e., the occurrence of an abnormality in the first blower 11, is determined by the abnormality determinator 39. If the abnormal state is determined (Yes), the process goes to step S14. If the abnormal state is not determined (No), the process goes to step S12.

In step S12, the control circuit unit 3 controls the drive of the first motor 21 in response to the speed command signal Sc. In other words, the PWM command part 33 outputs the PWM setting command signal S3 based on the speed command signal Sc. The drive control signal Sd is output from the control circuit unit 3 and the motor drive unit 2 thereby drives the first motor 21. In other words, the first motor 21 is driven in the first drive mode.

In step S13, the communication processor 38 ascertains whether or not a checking time on which an inquiry is made has come. The checking time is, for example, a time after a lapse of a predetermined period following previous transmission of an inquiry. If the checking time has come (Yes), the process goes to step S17 in FIG. 4. If the checking time has not come (No), the process returns to step S11.

In step S14, the communication processor 38 sends a highest-rotation-rate request command to the second blower 12 through the transmitter-receiver 37. The highest-rotation-rate request command is a command used to drive the second motor 22 in the second drive mode. The highest-rotation-rate request command is sent and thus the drive mode in which the second motor 22 is driven switches from the first drive mode to the second drive mode, and the second motor 22 is driven at a highest possible rotation rate.

In step S15, the communication processor 38 ascertains whether or not a non-abnormal state, i.e., no abnormality in the first blower 11, is determined by the abnormality determinator 39. If the non-abnormal state is determined (Yes), the process goes to step S16. If the non-abnormal state is not determined, i.e., the abnormal state is determined, (No), the process repeats step S15.

In step S16, the communication processor 38 sends a return command to the second blower 12 through the transmitter-receiver 37. The return command is a command used to drive the second motor 22 in the first drive mode. The return command is sent and thus the drive mode in which the second motor 22 is driven switches from the second drive mode to the first drive mode, and the second motor 22 is driven at a rotation rate associated with the speed command signal Sc. When step S16 is completed, the process returns to step S11.

In step S17, as shown in FIG. 4, the communication processor 38 makes an inquiry to the second blower 12. In other words, the communication processor 38 sends a command used to check a rotational state (hereinafter sometimes referred to simply as a "check command") to the second blower 12 through the transmitter-receiver 37.

In step S18, the communication processor 38 ascertains whether or not the first blower 11 has received a normal-answer sent from the second blower 12. If the normal-answer is received (Yes), the process returns to step S11 in FIG. 3. If the normal-answer is not received (No), the process goes to step S19.

In step S19, the communication processor 38 ascertains whether or not the first blower 11 has received an abnormal-answer sent from the second blower 12. If the abnormal-answer is received (Yes), the process goes to step S21. If the abnormal-answer is not received (No), the process goes to step S20.

In step S20, the communication processor 38 ascertains whether or not a predetermined length of time has elapsed since the sending of the check command. If the predetermined length of time has elapsed since the sending of the check command (Yes), the process goes to step S21. If the predetermined length of time has not elapsed since the sending of the check command (No), the process returns to step S18.

In step S21, the control circuit unit 3 controls the drive of the first motor 21 at a highest possible rotation rate. In other words, the communication processor 38 outputs the setting signal S9. In response to the setting signal S9, the PWM command part 33 outputs the PWM setting command signal S3 that is not based on the speed command signal Sc so as to enable the rotor of the first motor 21 to rotate at the highest rotation rate. In response to the PWM setting command signal S3 output in this way, the drive control signal Sd is output from the control circuit unit 3 and thus the first motor 21 is driven in the second drive mode.

In step S22, while the first motor 21 is driven in the second drive mode, the communication processor 38 ascertains whether or not a checking time on which an inquiry is made has come. If the checking time has not come (No), the process returns to step S21 to allow the first motor 21 to remain driven in the second drive mode. If the checking time has come (Yes), the process returns to step S17.

In other words, while the first motor 21 is driven in the second drive mode, the communication processor 38 periodically communicates with the second blower 12 (step S17) and in response to a normal-answer from the second blower 12 (Yes in step S18), puts the operation mode back from the second drive mode to the first drive mode (No in step S11 and step S12). Meanwhile, in response to an abnormal-answer from the second blower 12 (Yes in step S19) or if the predetermined length of time has elapsed (Yes in step S20) since the sending of the check command (step S17), the communication processor allows the first motor 21 to remain driven in the second drive mode.

Figure 5:
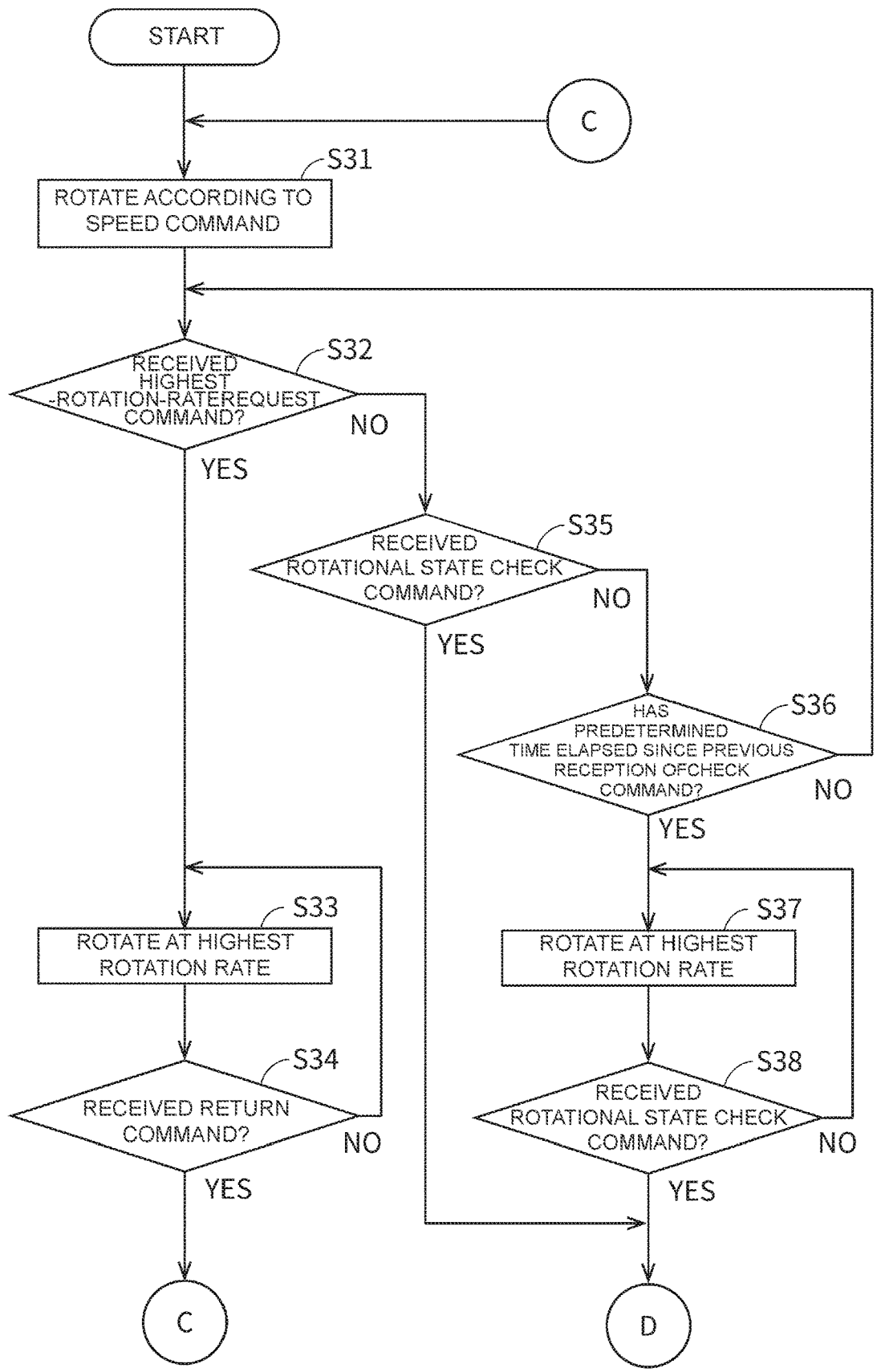
FIG. 5 A first flowchart showing an example of an operational process executed by a control circuit unit in a second motor drive controller.
Figure 6:
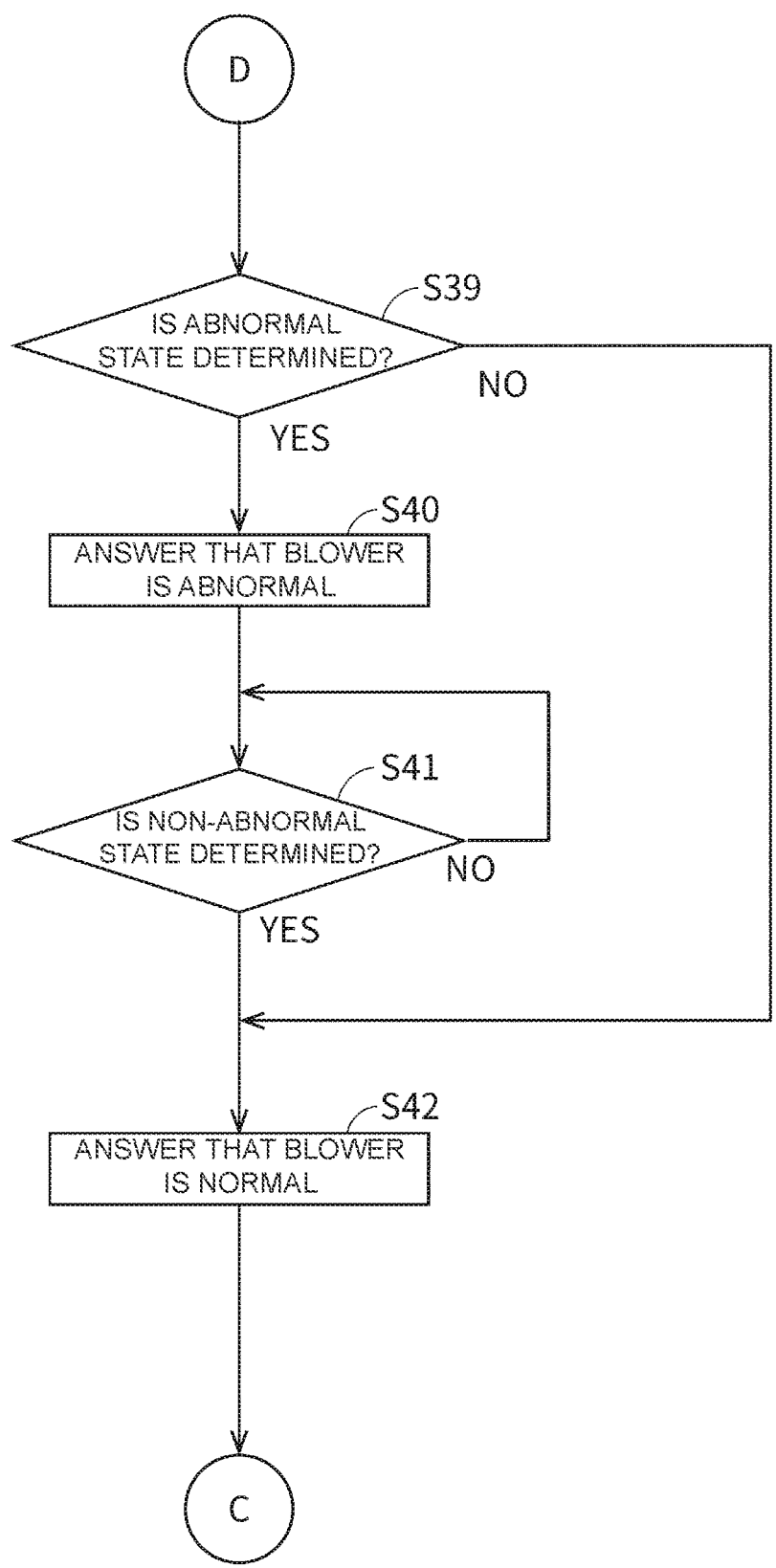
FIG. 6 A second flowchart showing an example of an operational process executed by the control circuit unit in the second motor drive controller.

FIG. 5 is a first flowchart showing an example of an operational process executed by the control circuit unit 3 in the second motor drive controller 112. FIG. 6 is a second flowchart showing an example of an operational process executed by the control circuit unit 3 in the second motor drive controller 112.

In the description given of FIGS. 5 and 6, operations conducted by the components of the second blower 12 are shown unless otherwise specified.

In step S31, as shown in FIG. 5, the control circuit unit 3 controls the drive of the second motor 22 in response to the speed command signal Sc. In other words, the PWM command part 33 outputs the PWM setting command signal S3 based on the speed command signal Sc. The drive control signal Sd is output from the control circuit unit 3 and the motor drive unit 2 thereby drives the second motor 22. In other words, the second motor 22 is driven in the first drive mode.

In step S32, the communication processor 38 ascertains whether or not the second blower 12 has received a highest-rotation-rate request command sent from the first blower 11. If the highest-rotation-rate request command is received (Yes), the process goes to step S33. If the highest-rotation-rate request command is not received (No), the process goes to step S35.

In step S33, the control circuit unit 3 controls the drive of the second motor 22 at a highest possible rotation rate. In other words, the communication processor 38 outputs the setting signal S9. In response to the setting signal S9, the PWM command part 33 outputs the PWM setting command signal S3 that is not based on the speed command signal Sc so as to enable the rotor of the second motor 22 to rotate at the highest rotation rate. In response to the PWM setting command signal S3 output in this way, the drive control signal Sd is output from the control circuit unit 3 and thus the second motor 22 is driven in the second drive mode. To put it another way, the drive mode in which the second motor 22 is driven is switched from the first drive mode to the second drive mode.

In step S34, while driving the second motor 22 in the second drive mode because of reception of the highest-rotation-rate request command in this way, the communication processor 38 ascertains whether or not the second blower 12 has received a return command sent from the first blower 11. If the return command is not received (No), the process returns to step S33 and allows the second motor 22 to remain driven in the second drive mode. Meanwhile, if the return command is received (Yes), the process returns to step S31 to put the operation mode back from the second drive mode to the first drive mode (step S31).

In step S35, the communication processor 38 ascertains whether or not the second blower 12 has received a rotational state check command sent from the first blower 11. If the check command is received (Yes), the process goes to step S39 in FIG. 6. If the check command is not received (No), the process goes to step S36.

In step S36, the communication processor 38 ascertains whether or not a predetermined length of time has elapsed since timing of previous reception of the check command. If the predetermined length of time has elapsed since the timing of the previous reception (Yes), the process goes to step S37. If the predetermined length of time has not elapsed since the timing of the previous reception (No), the process returns to step S32.

In step S37, the control circuit unit 3 controls the drive of the second motor 22 at a highest possible rotation rate. In other words, the communication processor 38 outputs the setting signal S9. In response to the setting signal S9, the PWM command part 33 outputs the PWM setting command signal S3 that is not based on the speed command signal Sc so as to enable the rotor of the second motor 22 to rotate at the highest rotation rate. In response to the PWM setting command signal S3 output in this way, the drive control signal Sd is output from the control circuit unit 3 and thus the second motor 22 is driven in the second drive mode.

In step S38, while the second motor 22 is driven in the second drive mode after a lapse of the predetermined length of time following the timing of the previous reception of the check command in this way, the communication processor 38 ascertains whether or not the second blower 12 has received a rotational state check command sent from the first blower 11. If the check command is not received (No), the process returns to step S37 and allows the second motor 22 to remain driven in the second drive mode. If the check command is received (Yes), the process goes to step S39 in FIG. 6.

In other words, when the second motor 22 is driven in the second drive mode after a lapse of the predetermined length of time following the timing of the previous reception of the check command, the communication processor 38 allows the second motor 22 to remain driven in the second drive mode until the second blower 12 receives the check command from the first blower 11. When receiving the check command, the second blower 12 makes a response to the check command as described below and puts the operation mode back from the second drive mode to the first drive mode (step S31).

In step S39, as shown in FIG. 6, the communication processor 38 ascertains whether or not an abnormal state, i.e., the occurrence of an abnormality in the second blower 12, is determined by the abnormality determinator 39. If the abnormal state is determined (Yes), the process goes to step S40. If the abnormal state is not determined (No), the process goes to step S42.

In step S40, the communication processor 38 sends information to the effect that the second blower 12 is abnormal (an abnormal-answer) to the first blower 11 through the transmitter-receiver 37. As a result of this, in the first blower 11, the first motor 21 is driven in the second drive mode.

In step S41, after giving the abnormal-answer, the communication processor 38 ascertains whether or not a non-abnormal state, i.e., no abnormality in the second blower 12, is determined by the abnormality determinator 39. If the non-abnormal state is not determined (No), the process repeats step S41. If the non-abnormal state is determined (Yes), the process goes to step S42.

In step S42, the communication processor 38 sends information to the effect that the second blower 12 is normal (a normal-answer) to the first blower 11 through the transmitter-receiver 37. In this case, in the first blower 11, the drive mode switches to the first drive mode, and the first motor 21 is driven at a rotation rate associated with the speed command signal Sc. In other words, if the first motor 21 is driven in the first drive mode, the first motor 21 remains driven in the first drive mode. Meanwhile, if the first motor 21 is driven in the second drive mode, the operation mode is switched from the second drive mode to the first drive mode to cause the first motor 21 to be driven in the first drive mode.

In this way, in the present embodiment, the first blower 11 and the second blower 12 control the driving of the motors 21 and 22 in response to a result of communication between the blowers. Hence, the fan 1 as a whole operates as shown in FIGS. 7 to 11 below. A detailed description of the operations conducted by the blowers 11 and 12 is as given above. Thus, in the following, a description of the operations may be partly omitted.

Figure 7:
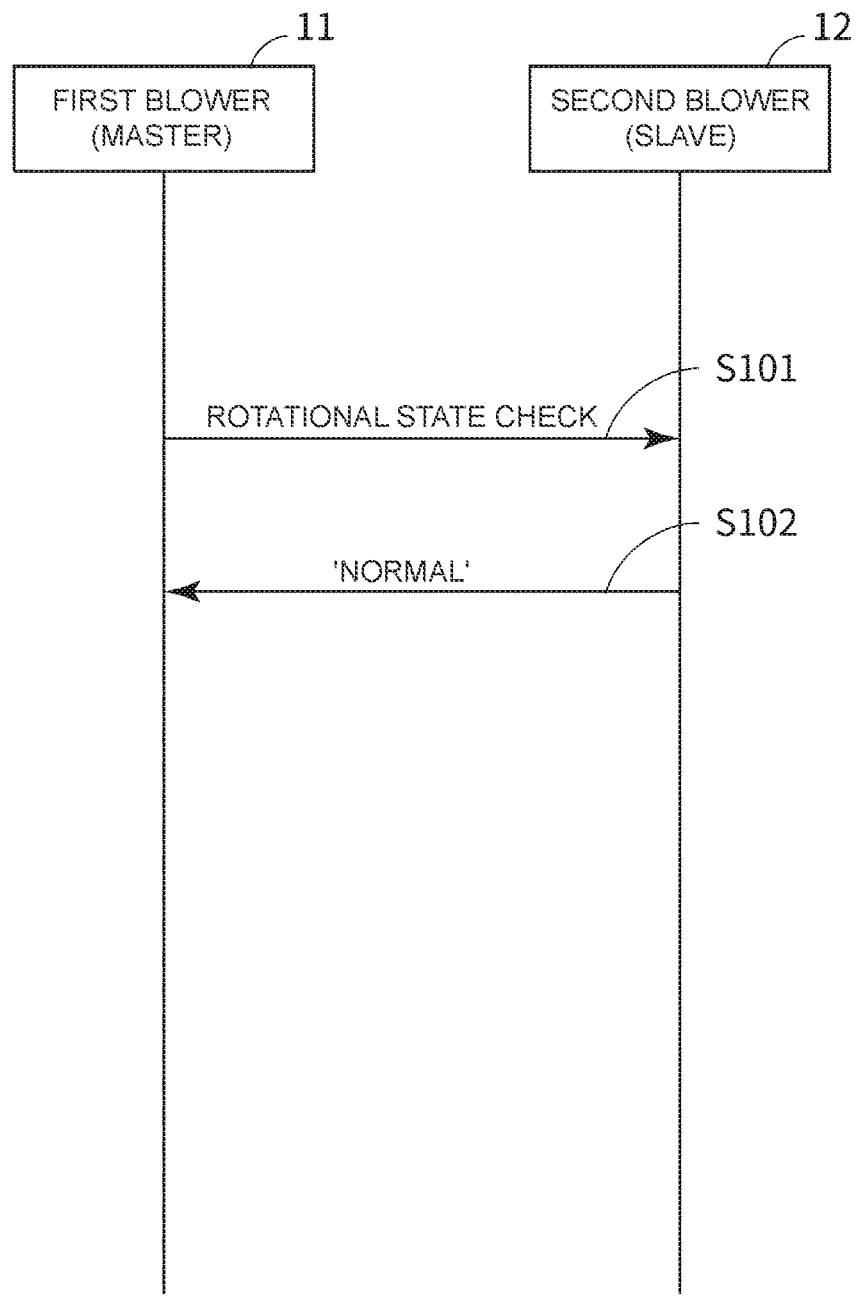
FIG. 7 A sequence diagram illustrating an example operation conducted by a fan when a first blower and a second blower both operate normally.

FIG. 7 is a sequence diagram illustrating an example operation conducted by the fan 1 when the first blower 11 and the second blower 12 both operate normally.

As shown in FIG. 7, when the first blower 11, the master, is in a normal state, a rotational state check command is periodically sent to the second blower 12, the slave, (step S101). In other words, the first blower 11 asks the second blower 12 about a rotational state the second motor 22 is in.

In response, since the second motor 22 is driven in a normal state, the second blower 12 sends the first blower 11 an answer to the effect that the second blower 12 is normal (step S102). In other words, the second blower 12 gives a normal-answer.

In this way, when the blowers 11 and 12 are in a normal state, the blowers 11 and 12 enable the motors 21 and 22 to be driven in the first drive mode.

Figure 8:
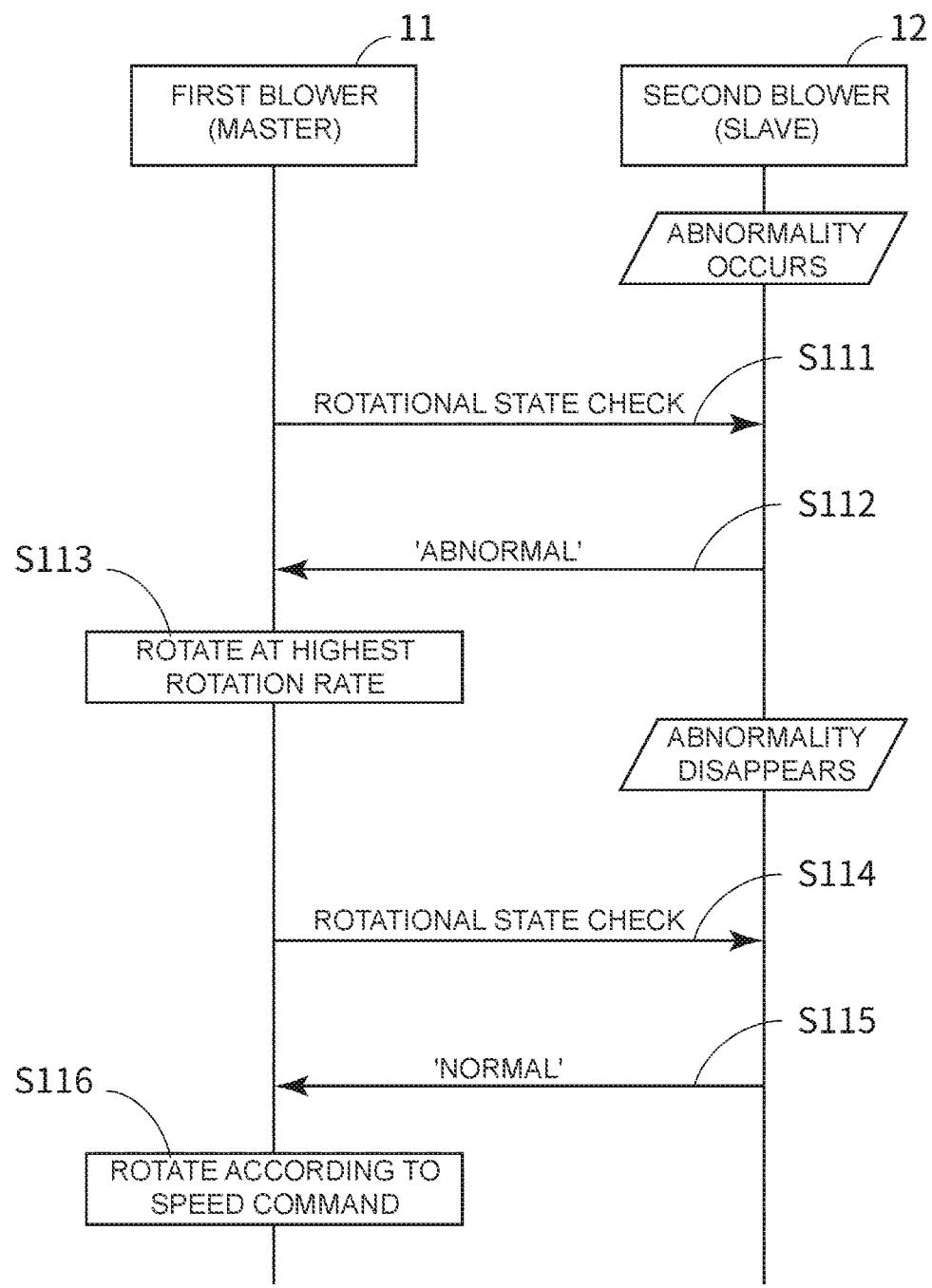
FIG. 8 A sequence diagram illustrating a first example operation conducted by the fan when the second blower is in an abnormal state.

FIG. 8 is a sequence diagram illustrating a first example operation conducted by the fan 1 when the second blower 12 is in an abnormal state.

As shown in FIG. 8, when the first blower 11 is in a normal state, a rotational state check command is periodically sent to the second blower 12 (step S111).

In response, the second blower 12, which is in an abnormal state, sends the first blower 11 an answer to the effect that the second blower 12 is abnormal (step S112). In other words, the second blower 12 gives an abnormal-answer.

In this way, in response to the abnormal-answer sent from the second blower 12, the first blower 11 enables the first motor 21 to be driven at the highest rotation rate (step S113). In other words, in the first blower 11, the first motor 21 is driven in the second drive mode.

Assuming that the abnormality in the second blower 12 has disappeared afterward, a description is given. When a rotational state check command is sent from the first blower 11 to the second blower 12 (step S114), the second blower 12 sends a normal-answer (step S115).

In this way, in response to the normal-answer sent from the second blower 12, the first blower 11 enables the first motor 21 to be driven such that the rotor rotates at a rotation rate corresponding to the speed command signal Sc (step S116). In other words, in the first blower 11, the operation mode is switched from the second drive mode to the first drive mode. As a result, the first blower 11 and the second blower 12 return to a state in which both the blowers enable the motors 21 and 22 to be driven in the first drive mode.

Figure 9:
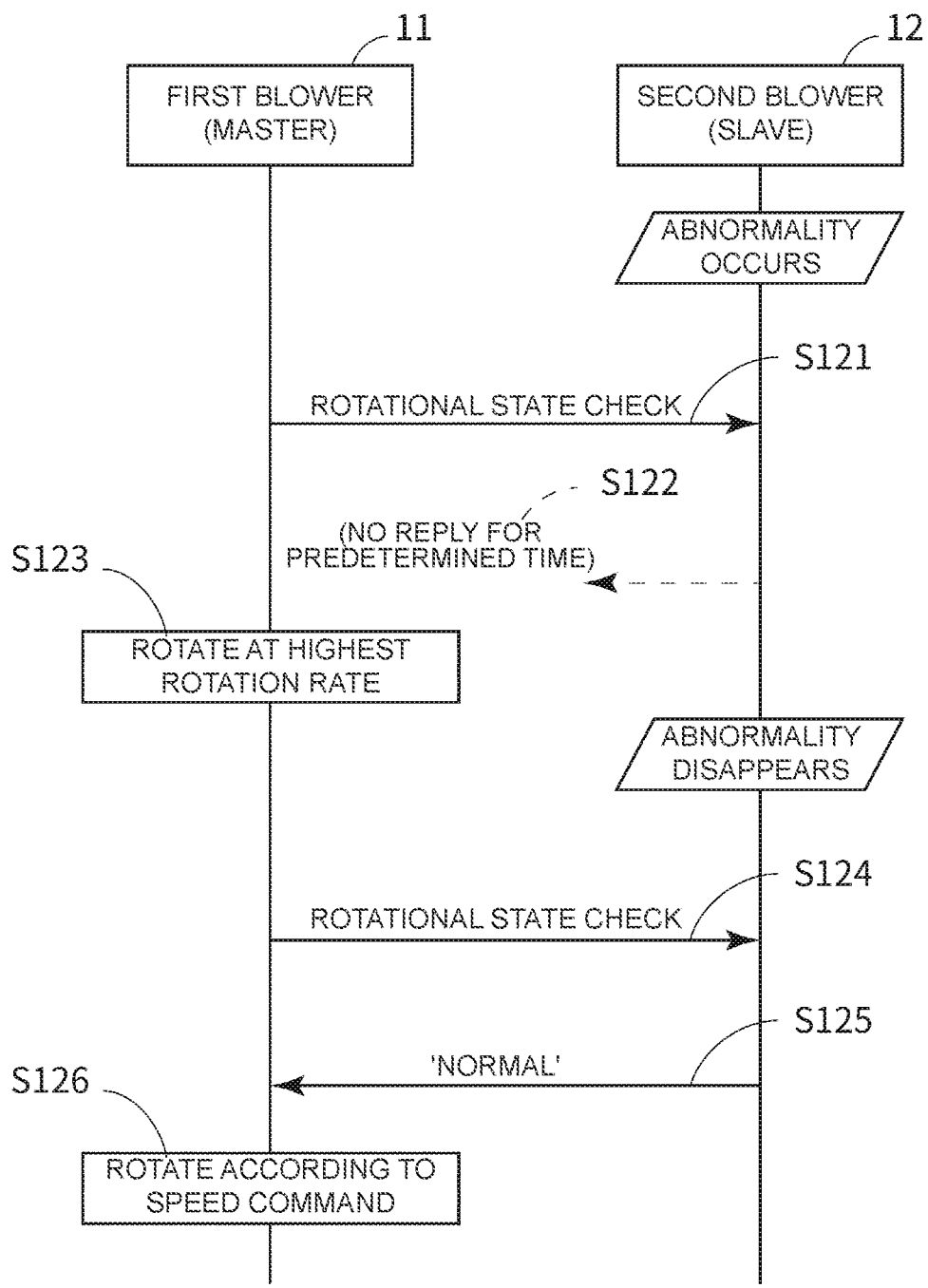
FIG. 9 A sequence diagram illustrating a second example operation conducted by the fan when the second blower is in an abnormal state.

FIG. 9 is a sequence diagram illustrating a second example operation conducted by the fan 1 when the second blower 12 is in an abnormal state.

As shown in FIG. 9, when the first blower 11 is in a normal state, a rotational state check command is periodically sent to the second blower 12 (step S121).

When the second blower 12, which is in an abnormal state, has not been able to respond to the check command for a predetermined length of time following the sending of the check command (step S122), the first blower 11 senses that.

Accordingly, the first blower 11 enables the first motor 21 to be driven at the highest rotation rate (step S123). In other words, in the first blower 11, the first motor 21 is driven in the second drive mode.

When the abnormality in the second blower 12 has disappeared afterward, a rotational state check command is sent from the first blower 11 to the second blower 12 (step S124). In response, the second blower 12 sends a normal-answer to the first blower 11 (step S125). Thus, the first blower 11 controls and enables the first motor 21 to be driven at a rotation rate corresponding to the speed command signal Sc (step S126). In other words, the first blower 11 and the second blower 12 return to a state in which both the blowers enable the motors 21 and 22 to be driven in the first drive mode.

Figure 10:
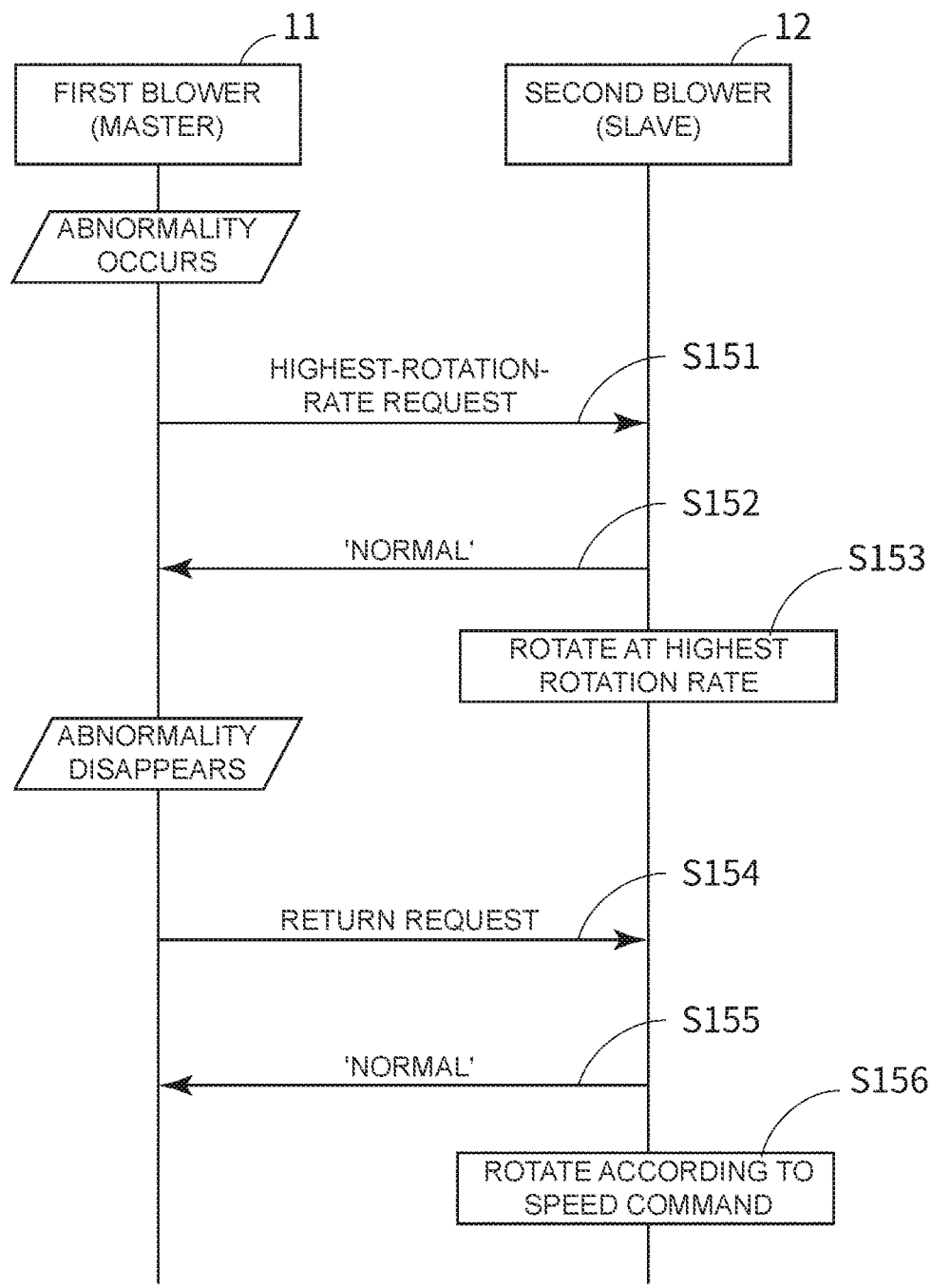
FIG. 10 A sequence diagram illustrating a first example operation conducted by the fan when the first blower is in an abnormal state.

FIG. 10 is a sequence diagram illustrating a first example operation conducted by the fan 1 when the first blower 11 is in an abnormal state.

As shown in FIG. 10, when the first blower 11 is in an abnormal state, the first blower 11 sends a highest-rotation-rate request command to the second blower 12 (step S151).

In response, since the second motor 22 is driven in a normal state, the second blower 12 sends the first blower 11 an answer to the effect that the second blower 12 is normal (step S152). In other words, the second blower 12 gives a normal-answer. The second blower 12 may send an answer to the effect that it has received the highest-rotation-rate request command or may not respond to the first blower 11 rather than giving the normal-answer.

The second blower 12, which has received the highest-rotation-rate request command, enables the second motor 22 to be driven at the highest rotation rate (step S153). In other words, in the second blower 12, the operation mode is switched from the first drive mode to the second drive mode to cause the second motor 22 to be driven in the second drive mode.

Assuming that the abnormality in the first blower 11 has disappeared afterward, a description is given. In response to that, a return command requesting a return to a normal drive mode, i.e., the first drive mode, is sent from the first blower 11 to the second blower 12 (step S154).

In this way, in response to the return command sent from the first blower 11, the second blower 12 sends a normal-answer (step S155). The second blower 12 enables the second motor 22 to be driven such that the rotor rotates at a rotation rate corresponding to the speed command signal Sc (step S156). In other words, in the second blower 12, the operation mode is switched from the second drive mode to the first drive mode. As a result, the first blower 11 and the second blower 12 return to a state in which both the blowers enable the motors 21 and 22 to be driven in the first drive mode.

Figure 11:
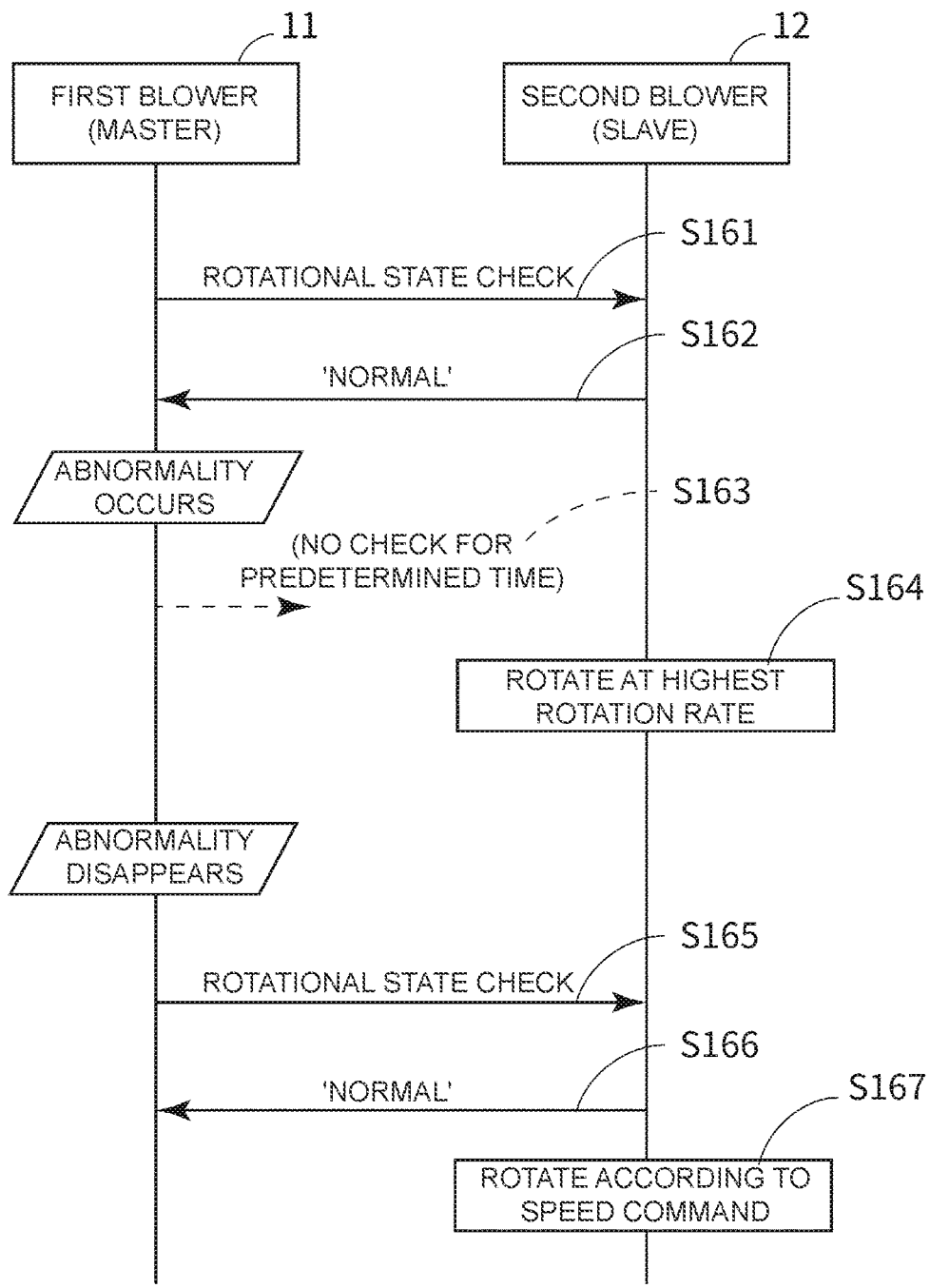
FIG. 11 A sequence diagram illustrating a second example operation conducted by the fan when the first blower is in an abnormal state.

FIG. 11 is a sequence diagram illustrating a second example operation conducted by the fan 1 when the first blower 11 is in an abnormal state.

As shown in FIG. 11, when the first blower 11 is in a normal state, a rotational state check command is sent to the second blower 12 (step S161). In response to the check command, when the second blower 12 is in a normal state, a normal-answer is sent to the first blower 11 (step S162).

When the first blower 11 gets into an abnormal state, the check command is stopped from being sent from the first blower 11 to the second blower 12. If the check command has not been sent for a predetermined length of time since previous sending of the check command (step S163), the second blower 12 senses that.

Accordingly, the second blower 12 enables the second motor 22 to be driven at the highest rotation rate (step S164). In other words, in the second blower 12, the second motor 22 is driven in the second drive mode.

When the abnormality in the first blower 11 has disappeared afterward, the first blower 11 restarts sending a rotational state check command to the second blower 12 (step S165). Alternatively, the first blower 11 may send a return command to the second blower 12.

In this way, in response to the check command sent from the first blower 11, the second blower 12 sends a normal-answer (step S166). The second blower 12 enables the second motor 22 to be driven such that the rotor rotates at a rotation rate corresponding to the speed command signal Sc (step S167). In other words, in the second blower 12, the operation mode is switched from the second drive mode to the first drive mode. As a result, the first blower 11 and the second blower 12 return to a state in which both the blowers enable the motors 21 and 22 to be driven in the first drive mode.

Figure 12:
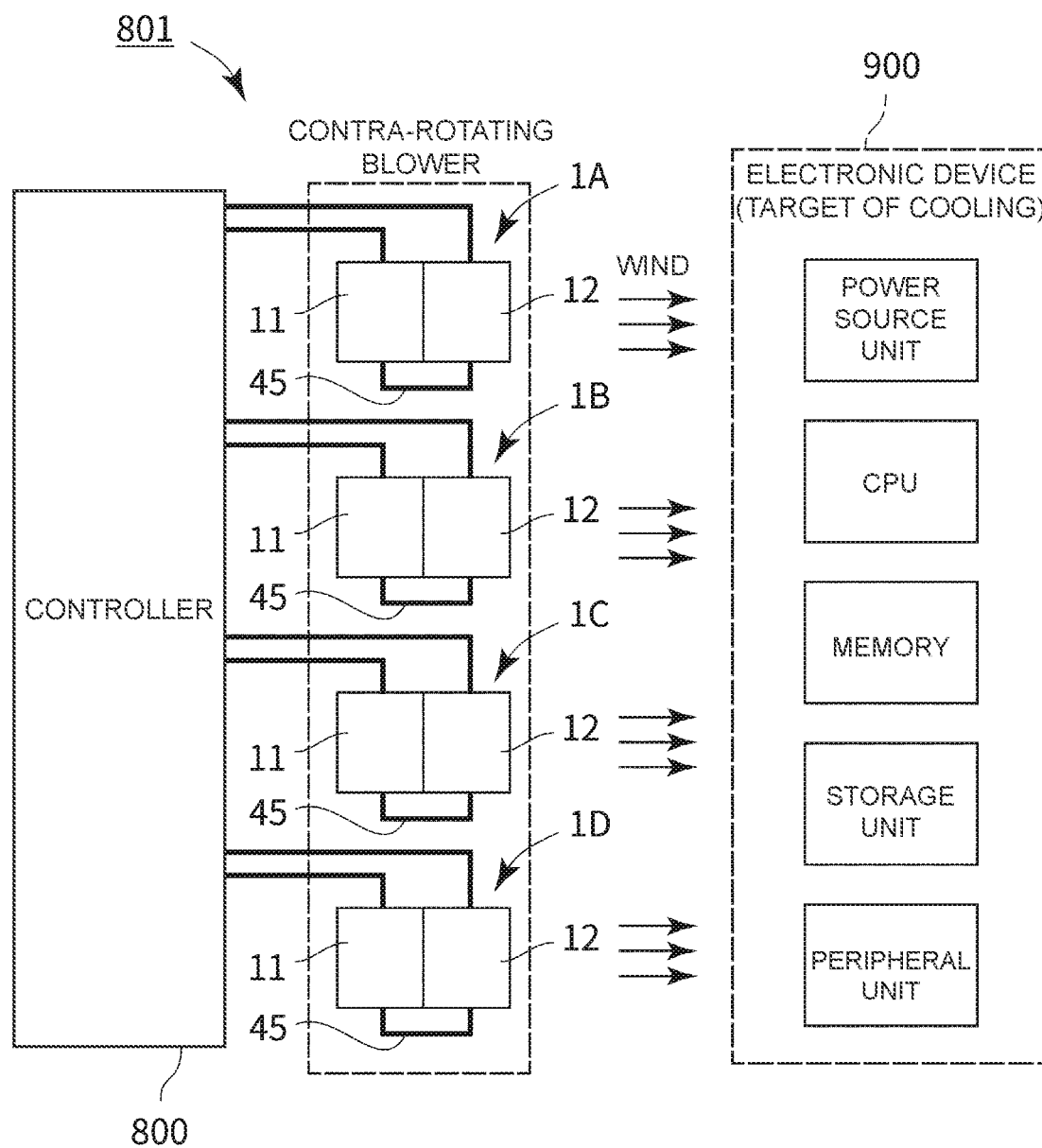
FIG. 12 A drawing showing an example of a blower system including a plurality of fans.

FIG. 12 is a drawing showing an example of a blower system 801 including a plurality of the fans 1.

As shown in FIG. 12, a plurality of the fans 1 may be put together to be used as one unit. For instance, the blower system 801 includes a single controller 800 and four fans 1 (fans 1A,1B,1C, and 1D). Each of the fans 1 is connected to the controller 800. When the operation mode is the first drive mode, the blowers 11 and 12 of each of the fans 1 enable the motors 21 and 22 to be driven based on the speed command signals Sc input from the controller 800. In each of the fans 1, the first blower 11 and the second blower 12 are connected to each other through the communication line 45, which enables communication between the blowers.

The blower system 801, for example, sends air from the fans 1 to an electronic device 900, such as an electronic computer, that is a target of cooling. The electronic device 900 is, for example, made up of a power source unit, a central processing unit (CPU), memory, a storage unit, and a peripheral unit. The electronic device 900 is cooled by a wind sent from the blower system 801 to an interior of the electronic device 900 and thus is able to maintain a normal operating state.

In the present embodiment, as described above, if the occurrence of an abnormality in one of the blowers 11 and 12 of any of the fans 1 causes the impeller 62 to stop rotating, the operation mode in which the other of the blowers 11 and 12 operates is switched from a first operation mode to a second operation mode. In the second operation mode, the other blower enables the impeller 62 to rotate at an increased rotation rate. This allows the other of the blowers 11 and 12 to compensate for a reduction in the fan's air-sending capacity caused by the occurrence of the abnormality in the one of the blowers 11 and 12. Thus, the blower system 801 can send a large volume of air to the target of cooling even during a period until the abnormal fan 1 is replaced by a normal fan.

In general, if a fan 1 that includes two blowers 11 and 12 can as a whole ensure satisfactory air volume and static pressure in view of a purpose, a controllable rotation rate range for each of the blowers 11 and 12 (e.g., a rotation rate range that allows feedback control of the rotation rate by speed command signals Sc output from a controller 800 to the blowers 11 and 12) is often set to a range that is more restricted than a range defined by a highest rotation rate at which each of the blowers 11 and 12 is capable of rotating.

In such a case in which the controllable rotation rate range for each of the blowers 11 and 12 is restricted as compared with a capacity of each of the blowers 11 and 12, the second blower 12 has malfunctioned, for example, and even if a speed command is executed to control and enable the first blower 11 that is not faulty to operate at the highest rotation rate within the controllable range, the first blower 11 merely rotates at a rotation rate that is more restricted than the highest rotation rate at which the first blower 11 is capable of rotating. Controlling the blower only in this way does not allow the fans 1 as a whole to ensure satisfactory air volume and static pressure if one of the blowers malfunctions. For instance, if the fan 1 is used for the purpose of cooling a heating element, the fan 1 cannot satisfactorily cool the heating element, a target of cooling, in some cases.

In contrast, in the present embodiment, if the second blower 12, for example, malfunctions, the first blower 11 that is not faulty enables the first motor 21 to be driven so as to rotate the rotor with highest possible torque. As a result, the blower system 801 can ensure air volume as large as possible and static pressure as high as possible even during a period until the fan 1 having an abnormality such as a malfunction of the second blower 12 is replaced by a normal fan. Thus, even if one of the blowers 11 and 12 gets into an abnormal state, only the other of the blowers 11 and 12 can mitigate a reduction in cooling performance.

An example illustrating this will be described. The description is given on the assumption that the blowers 11 and 12 being driven normally and operating in the first operation mode operate as shown below when a duty cycle of the speed command signal Sc is 100%. Specifically, in the first blower 11, the first motor 21 is controlled and driven such that the rotor rotates at 20,000 rpm. Meanwhile, in the second blower 12, with a duty cycle of the PWM setting command signal S3 set to 50%, the second motor 22 is controlled and driven such that the rotor rotates at 10,000 rpm.

In this case, when the first blower 11 stops due to a malfunction, the second blower 12 operates in the second drive mode. In other words, the second blower 12 enables the second motor 22 to be driven with maximum torque. With a duty cycle of the PWM setting command signal S3 set to, for example, the highest 100%, the second motor 22 is controlled and driven such that the rotor rotates at 20,000 rpm, a highest possible rotation rate. This, even despite a malfunction of the first blower 11, allows the second blower 12 to operate so as to compensate for a decrease in capacity caused by the malfunction. As a result, the fan 1 as a whole can mitigate a reduction in performance.

Similarly, a description is given on the assumption that the blowers 11 and 12 being driven normally, when a duty cycle of the speed command signal Sc is 100%, control the motors 21 and 22 to be driven such that the rotors rotate at 5,000 rpm with duty cycles of both the PWM setting command signals S3 set to 50%. In this case, when the first blower 11 stops due to a malfunction, the second blower 12 sets the duty cycle of the PWM setting command signal S3 to the highest 100% and enables the second motor 22 to be driven with maximum torque. The rotor of the second motor 22 rotates, for example at 10,000 rpm, a highest possible rotation rate. When the second blower 12 stops due to a malfunction, the first blower 11 similarly enables the first motor 21 to be driven with maximum torque. This, even if the first blower 11 or the second blower 12 malfunctions, allows the fan 1 as a whole to mitigate a reduction in performance.

In this way, in response to a result of communication between the blowers 11 and 12 when an abnormality occurs in one of the blowers 11 and 12, the drive mode in which the other of the blowers 11 and 12 operates is switched. In other words, the blowers 11 and 12 monitor each other's operating states, and when an abnormality occurs in one of the blowers, the drive mode for the other blower is switched to the second drive mode. The drive mode is switched in this way as a result of direct communication between the blowers 11 and 12. This allows the motor drive controllers 111 and 112 to promptly increase the rotation rate at which the other of the blowers 11 and 12 is driven following the occurrence of an abnormality in the one of the blowers 11 and 12 as compared with a case in which a controller 800 determines states blowers 11 and 12 are in and switches between operation modes. The fan 1 as a single unit, in response to the occurrence of an abnormality in one of the blowers 11 and 12, enables the other blower to perform an action for compensation. This helps simplify a process controlled by the controller 800 and helps simplify a configuration of the blower system 801.

[Others]

The blowers and the motor drive controllers for the blowers forming the fan may have a circuit configuration other than the circuit configuration shown in the embodiment described above. Various circuit configurations designed to suit the purpose of the present invention can be applied. The blowers and the motor drive controllers for the blowers may be configured by partially combining characteristics of the above-described embodiment. In the embodiment described above, some components may not be provided, or some components may be configured in another form.

The control circuit unit is not limited to a control circuit unit that controls elements such that a style of operation in each drive mode represents one style specified in advance. For instance, the control circuit unit may be a control circuit unit evaluated such that the style of operation performed accordingly when elements are controlled by the control circuit unit in various ways represents a style suitable for the first operation mode or a style suitable for the second operation mode. Even in such a configuration, a change in the style of operation of the control circuit unit between the style suitable for the first operation mode and the style suitable for the second operation mode can be interpreted as a switch between operation modes in which the control circuit unit operates.

The fan may not be connected to the controller. For instance, the two motor drive controllers, when the operation mode is the first operation mode, may enable the motors to be driven at respective rotation rates corresponding to information about speed commands set in advance concerning rotation rates for the motors.

The first motor drive controller is not necessarily restricted to periodically sending an inquiry to the second blower but may, for example, irregularly send an inquiry. For instance, an inquiry may be sent at varying intervals, such as once a first interval (e.g., 100 milliseconds) before an inquiry subsequent to a previous one is made and then a second interval (e.g., 200 milliseconds) and a third interval (e.g., 300 milliseconds), varying intervals placed before subsequent inquiries are made. Even if an inquiry is sent at such irregular intervals, the fan may sense the occurrence of an abnormality when actual intervals for the inquiries exceed the first interval, the second interval, or the third interval by a predetermined length of time (e.g., 1 second).

A scheme or a protocol of communication between the first blower and the second blower is not limited to the one in the embodiment described above. Any of the first blower and the second blower may be a master in the communication. The first blower and the second blower may be configured to communicate wirelessly with each other. In this case, the communication line may not be provided.

The second drive mode is not limited to a mode in which the motor is driven with maximum torque. The motor may be driven at a rotation rate higher than a normal rotation rate (a rotation rate at which the motor is driven in the first drive mode). In other words, the duty cycle of the PWM setting command signal in the second drive mode may be set higher than a duty cycle of the PWM setting command signal at which the motor is driven in the first drive mode.

The second blower may be disposed on the inlet side (the suction side), and the first blower may be disposed on the outlet side (the discharge side). The rotation rates at which the first motor and the second motor are driven in the first drive mode may be identical to or be different from each other.

The fan may include the first blower and the second blower that are disposed such that centers of rotation axes of the blowers are not aligned with each other. At least one of the first blower and the second blower may not be an axial fan.

The fan may include three or more blowers. Even in this case, at least two of the plurality of the blowers may be configured to operate based on a result of communication between the two blowers as described above.

It may be only the first blower that controls the driving of the first motor based on a result of communication with the second blower while the second blower controls the driving of the second motor irrespective of a result of communication with the first blower.

The motors driven by the motor drive controllers in the present embodiment are not limited to three-phase brushless motors but may be motors with another number of phases or motors of other types. The number of the Hall elements is not limited to three. Motor position detection signals may be received using a detector other than the Hall elements. A detector such as a hall-effect IC may be used, for example. The motors may be driven by a sensor-less method without using a position detector such as a Hall element and a hall-effect IC.

The flowcharts and others described above are given to illustrate operational processes by way of example and the operational process are not limited to these examples. The steps shown in the drawings of the flowcharts are specific examples and sequences of the steps are not limited to these flowcharts. For instance, the sequences of the steps may be changed, another step may be inserted between the steps, or some steps may be parallelized.

The processes in the above-described embodiment may be executed in part or in whole by software or using a hardware circuit. For instance, the control circuit units are not limited to microcomputers. Processes executed by internal components of the control circuit units may be executed at least in part by software.

It should be construed that the embodiment described above is illustrative in all aspects, and is not restrictive. The scope of the present invention is represented by the scope of the claims and not by the above description, and it is intended that all modifications within the sense and scope equivalent to the claims are involved in the scope of the present invention.

LIST OF REFERENCE SIGNS 1 fan (example of a blower device),
11 first blower,
12 second blower,
21 first motor,
22 second motor,
45 communication line,
62 impeller,
111 first motor drive controller (example of first drive control unit, first communication unit, and first abnormality detection unit),
112 second motor drive controller (example of second drive control unit, second communication unit, and second abnormality detection unit),
800 controller (example of external device),
Sc speed command signal (example of speed command information)

The invention claimed is:

1. A blower device comprising a first blower and a second blower each including an impeller,
   wherein the first blower includes a first motor to rotate the impeller of the first blower, and a first motor drive controller to control driving of the first motor and communicate with the second blower,
   wherein the second blower includes a second motor to rotate the impeller of the second blower, a second motor drive controller to control driving of the second motor and communicate with the first blower,
   wherein the first blower and the second blower monitor an operating state of the second blower by communication results obtained by the first motor drive controller, and an operating state of the first blower by the communication results obtained by the second motor drive controller,
   wherein the first motor drive controller is adapted to detect an occurrence of an abnormality in the first blower,
   wherein the second motor drive controller is adapted to detect an occurrence of an abnormality in the second blower,
   when the occurrence of the abnormality in the first blower is detected, the first motor drive controller sends the second blower a command used to drive the second motor in a second drive mode,
   when the occurrence of the abnormality in the second blower is detected, the second motor drive controller sends information indicating the detection of the abnormality to the first blower,
   the first motor drive controller controls the driving of the first motor based on a result of communication with the second blower when the first motor drive controller receives information about the occurrence of the abnormality in the second blower, the first motor drive controller switches the drive mode for the first motor in either of a first drive mode and a second drive mode different from the first drive mode by switching between the first drive mode and the second drive mode based on a result of communication with the second blower, and
   the second motor drive controller controls the driving of the second motor based on a result of communication with the first blower when the second motor drive controller receives information about the occurrence of the abnormality in the first blower, the second motor drive controller switches the drive mode for the second motor in either of a first drive mode and the second drive mode different from the first drive by switching between the first drive mode and the second drive mode based on a result of communication with the first blower,
   wherein the first motor drive controller is configured to make an inquiry to the second blower, and
   when a response to the inquiry has not been sent from the second blower for a predetermined length of time, the first motor drive controller switches the drive mode for the first motor from the first drive mode to the second drive mode.

2. The blower device according to claim 1, wherein the first drive mode is a drive mode and in the drive mode, the motor is driven at a rotation rate corresponding to information about a speed command input from an external device.

3. The blower device according to claim 2, wherein the second drive mode is a drive mode and in the drive mode, the motor is driven at a predetermined rotation rate higher than the rotation rate corresponding to information about the speed command.

4. The blower device according to claim 1, wherein the second drive mode is a drive mode and in the drive mode, the motor is driven so as to output torque as high as possible and rotate a rotor of the motor with the highest torque.

5. The blower device according to claim 1, wherein in response to reception of information indicating the second blower is normal through communication with the second blower while driving the first motor in the second drive mode, the first motor drive controller switches the drive mode for the first motor from the second drive mode to the first drive mode.

6. The blower device according to claim 1, comprising a communication line connecting the first blower with the second blower to enable communication between the first and the second blowers.

7. The blower device according to claim 1, wherein the first blower and the second blower are axial fans disposed with centers of rotation axes of impellers of the first and the second blowers being aligned along an axial-flow direction, and the first blower and the second blower cause the respective impellers to rotate in mutually different directions.

8. A blower device comprising a first blower and a second blower each including an impeller,
   wherein the first blower includes a first motor to rotate the impeller of the first blower, and a first motor drive controller to control driving of the first motor and communicate with the second blower,
   wherein the second blower includes a second motor to rotate the impeller of the second blower, a second motor drive controller to control driving of the second motor and communicate with the first blower,
   wherein the first blower and the second blower monitor an operating state of the second blower by communication results obtained by the first motor drive controller, and an operating state of the first blower by the communication results obtained by the second motor drive controller, wherein the first motor drive controller is adapted to detect an occurrence of an abnormality in the first blower, wherein the second motor drive controller is adapted to detect an occurrence of an abnormality in the second blower, when the occurrence of the abnormality in the first blower is detected, the first motor drive controller sends the second blower a command used to drive the second motor in a second drive mode, when the occurrence of the abnormality in the second blower is detected, the second motor drive controller sends information indicating the detection of the abnormality to the first blower, the first motor drive controller controls the driving of the first motor based on a result of communication with the second blower when the first motor drive controller receives information about the occurrence of the abnormality in the second blower, the first motor drive controller switches the drive mode for the first motor in either of a first drive mode and a second drive mode different from the first drive mode by switching between the first drive mode and the second drive mode based on a result of communication with the second blower, and the second motor drive controller controls the driving of the second motor based on a result of communication with the first blower when the second motor drive controller receives information about the occurrence of the abnormality in the first blower, the second motor drive controller switches the drive mode for the second motor in either of a first drive mode and the second drive mode different from the first drive by switching between the first drive mode and the second drive mode based on a result of communication with the first blower, wherein the first motor drive controller is configured to make an inquiry to the second blower, and when the inquiry has not been made by the first motor drive controller for a predetermined length of time, the second motor drive controller switches the drive mode for the second motor from the first drive mode to the second drive mode.

* * * * *